(12) United States Patent
Lazarus et al.

(10) Patent No.: US 8,567,121 B2
(45) Date of Patent: Oct. 29, 2013

(54) NUTRIENT APPLICATION FORECASTING SYSTEM (NAFS) IN PARTICULAR FOR AFO/CAFO LIQUID MANURE APPLICATIONS

(75) Inventors: Jay Lazarus, Santa Fe, NM (US); Reddy Rammohan Ganta, Santa Fe, NM (US)

(73) Assignee: CAFOweb, LLC, Santa Fe, NM (US)

( * ) Notice: Subject to any disclaimer, the term of this patent is extended or adjusted under 35 U.S.C. 154(b) by 871 days.

(21) Appl. No.: 12/462,270

(22) Filed: Jul. 31, 2009

(65) Prior Publication Data

US 2010/0024296 A1 Feb. 4, 2010

Related U.S. Application Data

(60) Provisional application No. 61/137,629, filed on Aug. 1, 2008.

(51) Int. Cl.
*A01C 3/00* (2006.01)
(52) U.S. Cl.
USPC .............................. 47/58.1 SC; 47/DIG. 10

(58) Field of Classification Search
USPC ....... 47/58.1 SC, 58.1 R, DIG. 10, FOR. 100, 47/1.01 R, 58.1 FV; 705/7.31
See application file for complete search history.

(56) References Cited

U.S. PATENT DOCUMENTS

| | | | |
|---|---|---|---|
| 6,206,612 B1 * | 3/2001 | Meyer | 405/36 |
| 7,188,450 B2 * | 3/2007 | Raun et al. | 47/58.1 SC |
| 2003/0018431 A1 * | 1/2003 | Hanson | 702/5 |
| 2003/0019152 A1 * | 1/2003 | Raun et al. | 47/58.1 SC |
| 2009/0229179 A1 * | 9/2009 | Hafeel et al. | 47/58.1 SC |
| 2012/0083907 A1 * | 4/2012 | Motavalli et al. | 700/90 |
| 2012/0123817 A1 * | 5/2012 | Hohenberger et al. | 705/7.12 |

* cited by examiner

*Primary Examiner* — T. Nguyen
(74) *Attorney, Agent, or Firm* — Sue Z. Shaper

(57) ABSTRACT

The invention relates to methods, using a computer and software system, for providing real time running forecasts during an agronomic period of a capacity for absorbing nutrients by a plurality of fields according to an agronomic standard, and/or for providing a running real time forecast for a plurality of fields of capacity for absorbing nutrients by current status versus agronomic limit of a targeted substance.

25 Claims, 41 Drawing Sheets

Schematic representation of Nutrient Application Forecasting System (NAFS) of preferred embodiment.

Figure 1. Schematic representation of Nutrient Application Forecasting System (NAFS) of preferred embodiment.
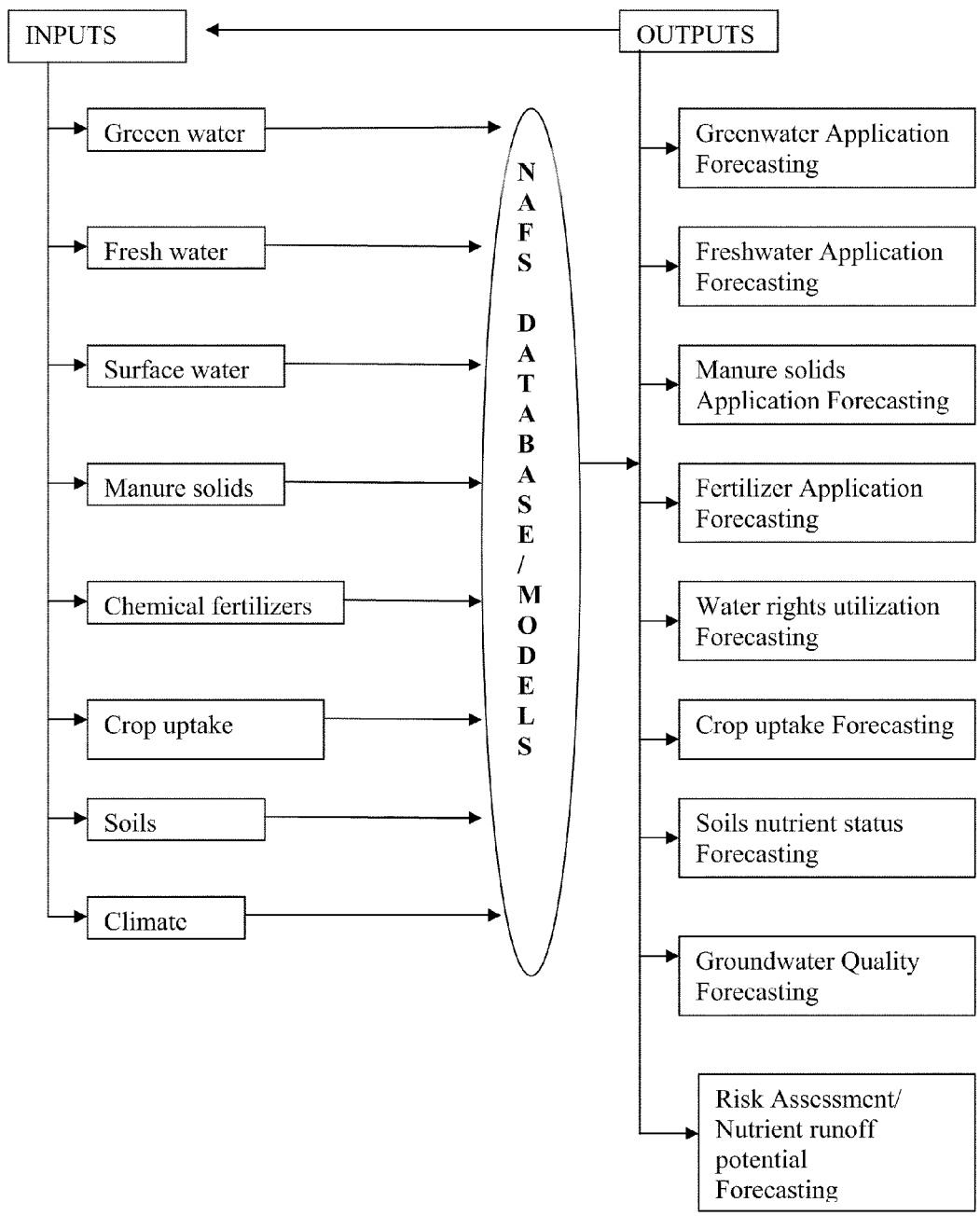

Figure 2. Schematic representation of Nutrient Application Forecasting System (NAFS)
*Water rights module*
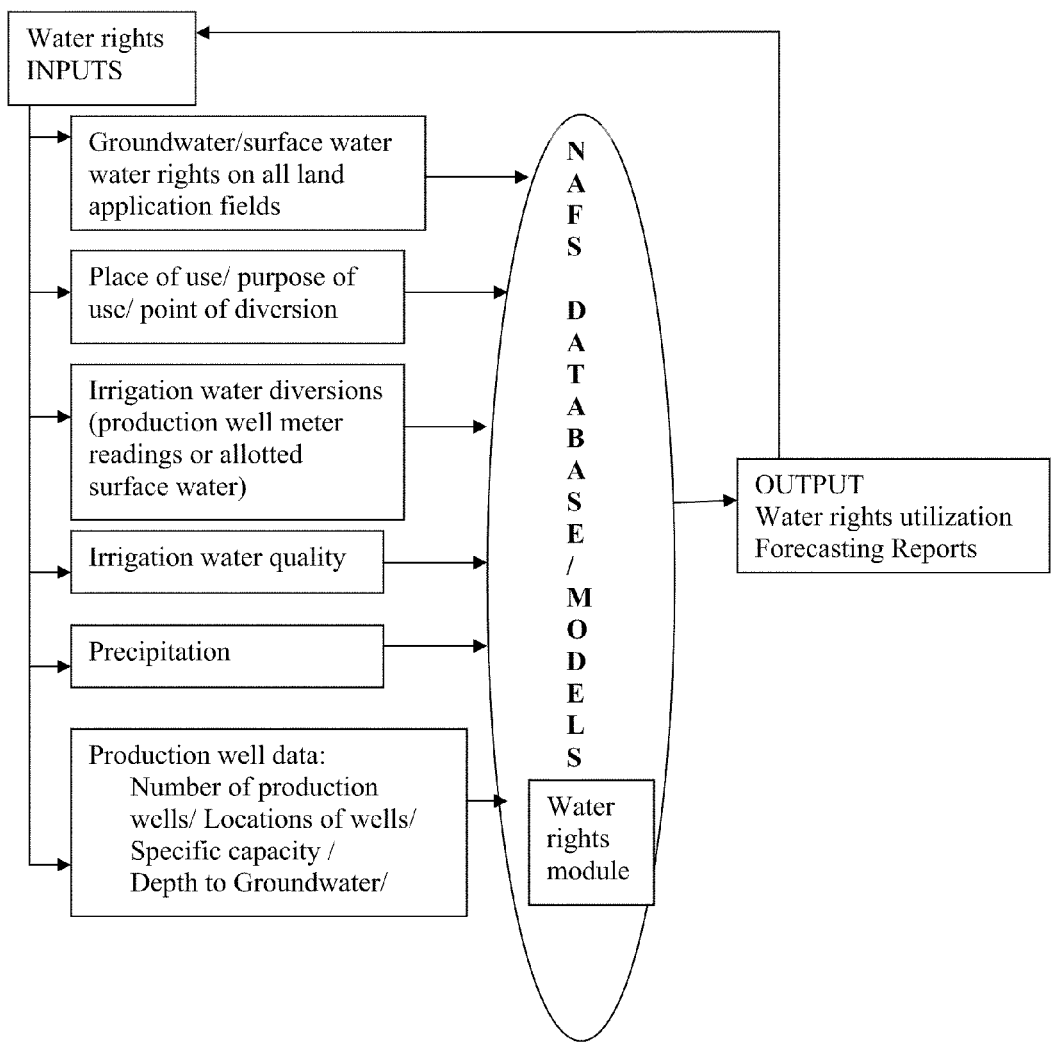

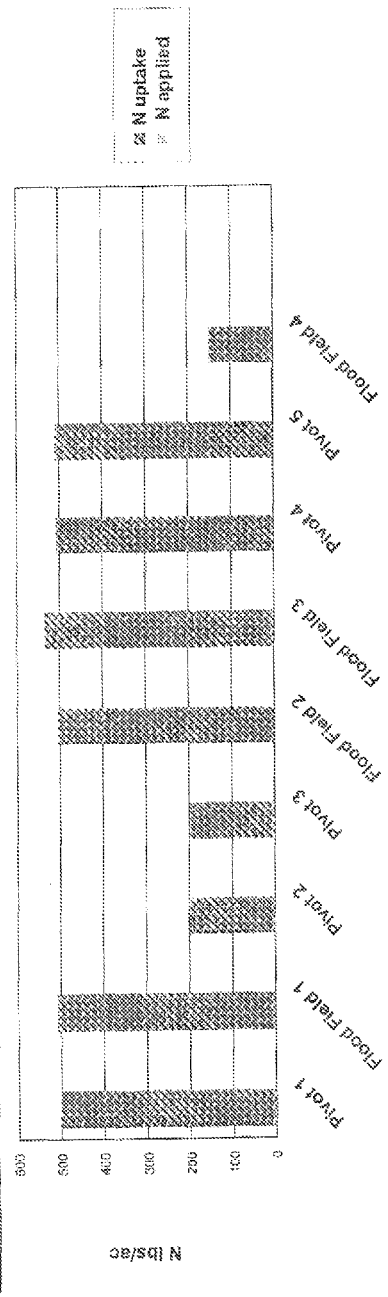

Fig. 3B

| Field # | Field Name | Ac | Crop | Crop uptake lbs/ac/yr | Soil NO3- ppm | YTD Vol. applied (gal) | YTD N Applied Thru Liquid Manure lbs/ac | YTD N Applied Thru Solid Manure lbs/ac | YTD N Applied Thru Fertilizer/Irr. Water lbs/ac | YTD N Applied thru lbs/ac | YTD P Applied % | Vol. of greenwater that can be applied (M Gal) N based Barn1 | Barn2 | Barn3 |
|---|---|---|---|---|---|---|---|---|---|---|---|---|---|---|
| 17 | Pivot 4 | 125 | pasture grass/rye | 508 | 14.33 | 0 | 0.0 | 0.00 | 0.00 | 0.00 | 0 | 0.00 | 16.54 | 23.78 | 54.55 |
| 18 | Pivot 5 | 125 | pasture grass/rye | 508 | 27.67 | 0 | 0.0 | 0.00 | 0.00 | 0.00 | 0 | 0.00 | 16.54 | 23.78 | 54.35 |
| 21 | Flood Field 4 | 40 | winter forage | 150 | 52.00 | 0 | 0.0 | 0.00 | 0.00 | 0.00 | 0 | 0.00 | 1.56 | 2.25 | 5.14 |
| Total | | 815 | | | | 0 | | 0.00 | 0.00 | 0.08 | | | 87.54 | 125.83 | 287.62 |

* Volume of greenwater that can be applied for the remainder of the year from either Barn 1 or Barn 2 or Barn 3 based on N uptake

| | Lagoon TKN (mg/l) | | | Avg Lagoon P (mg/l) |
|---|---|---|---|---|
| | Barn1 | Barn2 | Barn3 | |

| Month | | Discharge (M Gal) | |
|---|---|---|---|
| | Barn1 | Barn2 | Barn3 |
| Jan 2008 | | | |
| Feb 2008 | | | |
| Mar 2008 | | | |
| Apr 2008 | | | |
| May 2008 | | | |
| Jun 2008 | | | |
| Jul 2008 | | | |
| Aug 2008 | | | |
| Sep 2008 | | | |
| Oct 2008 | | | |
| Nov 2008 | | | |
| Dec 2008 | | | |

| | Barn1 | Barn2 | Barn3 |
|---|---|---|---|
| Permitted greenwater discharge from Barn to Lagoon per year | 63.87 | 63.87 | 100.37 |
| YTD actual greenwater discharge from Barn to Lagoon | 0 | 0 | 0 |
| Amount of GW to be managed for the remainder of year based on permitted volumes | 63.87 | 63.87 | 100.37 |
| % permitted greenwater discharge | 0 | 0 | 0 |
| Projected Avg. Annual greenwater discharge based on historic data | 57.89 | 54.48 | 85.18 |
| Projected amount of GW to be managed for the remainder of year based on historic data | 57.89 | 54.48 | 85.18 |

Alerts
Fields #4 and #21 have very high soil nitrogen. Please avoid any applications on these fields.
Note: Vol. of max. allowable greenwater that can be applied varies with the barn used for irrigation since TKN is different for each barn Caution: ▓ >50  ▓ >75%  ▓ >100% of yearly crop uptakeable N land applied   V. Low 0.01 - 5.0 ppm; Low 5 - 10 ppm; Moderate: 10 - 30 ppm; High 30-50 ppm; V. High >50 ppm   ( ) - Negative numbers NRCS Soil Test Interpretation for N:
Caution: Do not apply green water on fields with very high soil N Page 4/41                                                                                       Page 2 of 2

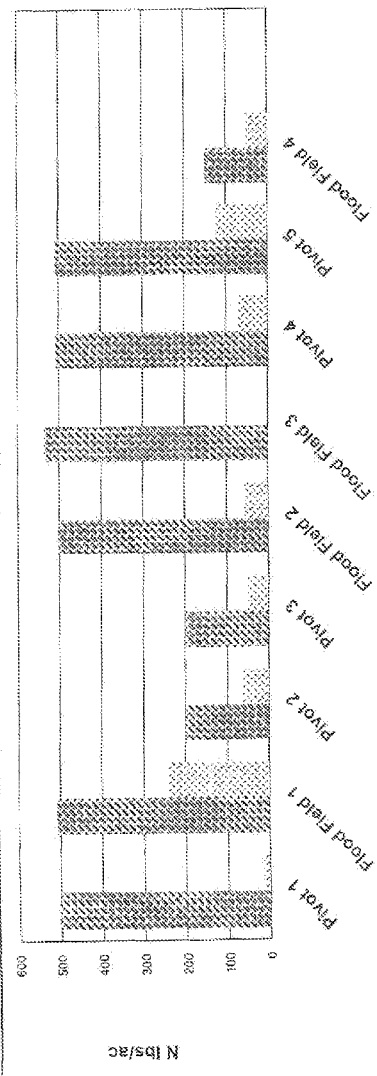

Fig. 6B

| Field # | Field Names | Ac | Crop | Crop uptake | Soil NO3- | YTD Vol. applied | YTD N Applied thru | | | YTD N Applied thru | YTD P Applied | Vol. of greenwater that can be applied (MGal) Based | | |
|---|---|---|---|---|---|---|---|---|---|---|---|---|---|---|
| | | | | | | | Liquid Manure | Solid Manure | Fertilizer/ Mr. Water | | | Barn1* | Barn2* | Barn3* |
| | | | | lbs/ac/yr | ppm | (gal) | lbs/ac | lbs/ac | lbs/ac | % | lbs/ac | | | |
| 17 | Pivot 4 | 125 | pasture grass/rye | 508 | 34.33 | 4,861,000 | 107.5 | 0.00 | 0.98 | 21 | 6.52 | 12.47 | 17.10 | 39.89 |
| 18 | Pivot 5 | 125 | pasture grass/rye | 508 | 27.67 | 8,741,900 | 154.4 | 61.70 | 1.75 | 43 | 11.67 | 9.06 | 12.42 | 28.98 |
| 21 | Flood Field 4 | 40 | winter forage | 150 | 52.00 | 518,800 | 43.8 | 0.00 | 0.32 | 33 | 2.16 | 1.00 | 1.57 | 3.19 |
| Total | | 815 | | | | 32,542,080 | 965.0 | 83.00 | 21.36 | | | 80.57 | 83.66 | 193.81 |

* Volume of greenwater that can be applied for the remainder of the year from either Barn 1 or Barn 2 or Barn 3 based on N uptake

| Month | Lagoon TKN (ppm) | | | Avg. Lagoon P (mg/l) |
|---|---|---|---|---|
| | Barn1 | Barn2 | Barn3 | |
| Jan 2008 | 460 | 320 | 140 | 22 |
| Feb 2008 | 470 | 360 | 150 | 23 |
| Mar 2008 | 510 | 370 | 160 | 20 |
| Apr 2008 | | | | |
| May 2008 | | | | |
| Jun 2008 | | | | |
| Jul 2008 | | | | |
| Aug 2008 | | | | |
| Sep 2008 | | | | |
| Oct 2008 | | | | |
| Nov 2008 | | | | |
| Dec 2008 | | | | |

| | Discharge (MGal) | | |
|---|---|---|---|
| | Barn1 | Barn2 | Barn3 |
| Permitted greenwater discharge from Barn to Lagoon per year | 63.87 | 63.87 | 100.37 |
| YTD actual greenwater discharge from Barn to Lagoon | 5.99 | 16.4 | 10.14 |
| Amount of GW to be managed for the remainder of year based on permitted volume | 57.88 | 47.47 | 90.23 |
| % permitted greenwater discharge | 9.38 | 25.68 | 10.10 |
| Projected Avg Annual greenwater discharge based on historic data | 57.89 | 54.48 | 65.18 |
| Projected amount of GW to be managed for the remainder of year based on historic data | 51.9 | 38.08 | 75.04 |

Alerts:
You have applied greenwater on fields #4 and #21 with very high soil nitrogen. Please avoid further applications on these fields.
Note: Vol. of max. allowable greenwater that can be applied varies with the barn used for irrigation since TKN is different for each barn Caution: ▓ >50   ▓ >75%   ▓ >100% of yearly crop uptakable N land applied     ( ) - Negative numbers
NRCS Soil Test Interpretation for N:    V, Low 0.01 - 5.0 ppm; Low 5 - 10 ppm; Moderate: 10 - 30 ppm; High 30-50 ppm; V. High >50 ppm
Caution: Do not apply green water on fields with very high soil N

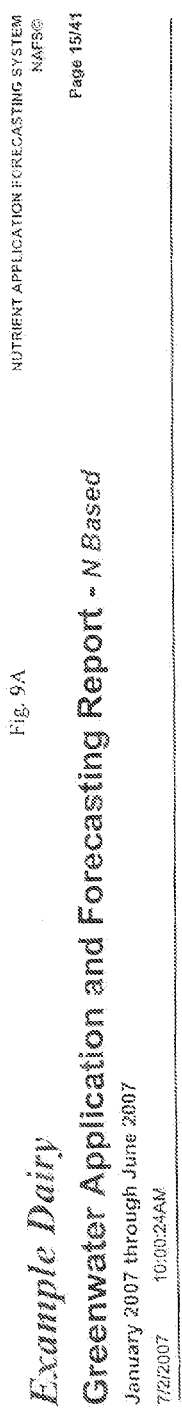
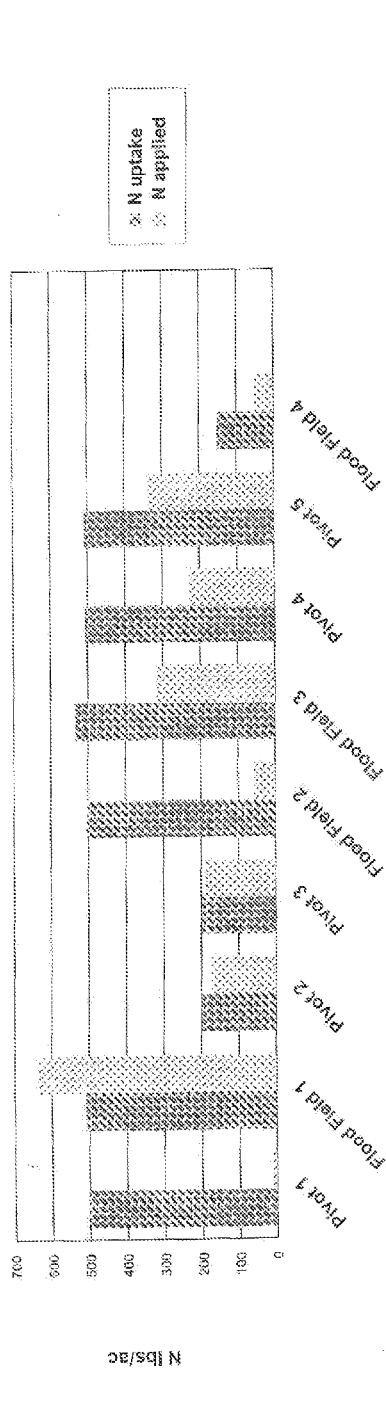
Fig. 9A

Fig. 9B

| Field # | Field Name | Ac. | Crop | Crop Uptake (lbs/ac/yr) | Soil NO3- (ppm) | YTD Vol. applied (gal) | YTD N Applied thru Liquid Manure (lbs/ac) | YTD N Applied thru Solid Manure (lbs/ac) | YTD N Applied thru Fertilizer/Irr Water (lbs/ac) | YTD N Applied thru (lbs/ac) | YTD P Applied (%) | Vol. of greenwater that can be applied (M Gal) N Based | | |
|---|---|---|---|---|---|---|---|---|---|---|---|---|---|---|
| | | | | | | | | | | | | Barn1 | Barn2 | Barn3 |
| 17 | Pivot 4 | 125 | pasture grass/rye | 508 | 34.33 | 11,158,000 | 228.2 | 0.00 | 2.23 | 230.44 | 45 | 19.37 | 7.87 | 11.33 | 25.98 |
| 18 | Pivot 5 | 125 | pasture grass/rye | 508 | 27.67 | 20,257,500 | 335.1 | 61.70 | 4.06 | 400.83 | 79 | 35.16 | 3.04 | 4.37 | 10.03 |
| 21 | Flood Field 4 | 40 | winter forage | 150 | 52.00 | 518,800 | 49.8 | 0.00 | 0.32 | 50.11 | 33 | 2.81 | 0.91 | 1.30 | 2.99 |
| Total | | 815 | | | | 65,656,400 | | | 89.00 | 1,933.0 | 33.08 | | 39.04 | 54.73 | 125.54 |

* Volume of greenwater that can be applied for the remainder of the year from either Barn 1 or Barn 2 or Barn 3 based on N uptake

| | Lagoon TKN (mg/l) | | | Avg. Lagoon P (mg/l) |
|---|---|---|---|---|
| Month | Barn1 | Barn2 | Barn3 | |
| Jan 2008 | 460 | 320 | 140 | 22 |
| Feb 2008 | 470 | 360 | 150 | 23 |
| Mar 2008 | 510 | 370 | 160 | 20 |
| Apr 2008 | 550 | 400 | 150 | 22 |
| May 2008 | 590 | 400 | 180 | 24 |
| Jun 2008 | 590 | 350 | 200 | 26 |
| Jul 2008 | | | | |
| Aug 2008 | | | | |
| Sep 2008 | | | | |
| Oct 2008 | | | | |
| Nov 2008 | | | | |
| Dec 2008 | | | | |

| | Discharge (M Gal) | | |
|---|---|---|---|
| | Barn1 | Barn2 | Barn3 |
| Permitted greenwater discharge from Barn to Lagoon, per year | 63.87 | 63.87 | 100.37 |
| YTD actual greenwater discharge from Barn to Lagoon | 9.59 | 28.56 | 27.41 |
| Amount of GW to be managed for the remainder of year based on permitted volumes | 54.28 | 35.21 | 72.96 |
| % permitted greenwater discharge | 15.01 | 44.86 | 27.31 |
| Projected Avg. Annual greenwater discharge based on historic data | 57.89 | 54.48 | 86.19 |
| Projected amount of GW to be managed for the remainder of the year based on historic data | 48.3 | 25.82 | 57.77 |

Alerts
You have applied greenwater on fields #4 and #21 with very high soil nitrogen. Please avoid further applications on these fields.
Note: Vol. of max. allowable greenwater that can be applied varies with the barn used for irrigation since TKN is different for each barn Caution: ▓ >50  ▓ >75%  ▓ >100% of yearly crop uptakable N and applied    ( ) - Negative numbers
NRCS Soil Test Interpretation for N:   V. Low 0.01 - 5.0 ppm; Low 5 - 10 ppm; Moderate: 10 - 39 ppm; High 39-60 ppm; V. High >50 ppm
Caution:  Do not apply green water on fields with very high soil N Page 16/41                                                                    Page 2 of 2

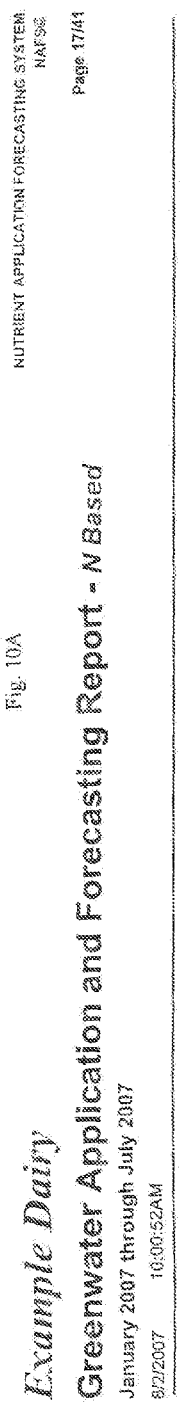

Fig. 10A

*Example Dairy*

Greenwater Application and Forecasting Report - N Based

January 2007 through July 2007

8/2/2007  10:00:52AM

NUTRIENT APPLICATION FORECASTING SYSTEM
NAFS©
Page 17/41

| Field # | Field Name | Ac | Crop | Crop uptake | Soil NO3- | YTD Vol. applied | YTD N Applied thru | | | YTD N Applied | | YTD P Applied | Vol. of greenwater that can be applied (MGal) | | | |
|---|---|---|---|---|---|---|---|---|---|---|---|---|---|---|---|---|
| | | | | | | | Liquid Manure | Solid Manure | Fertilizer/ Irr. Water | | | | N Based | | | |
| | | | | lbs/ac/yr | ppm | (gal) | (lbs/ac) | (lbs/ac) | (lbs/ac) | lbs/ac | % | lbs/ac | Barn1 | Barn2 | Barn3 |
| 3 | Pivot 1 | 120 | pasture grass/rye | 503 | 4.67 | 5,795,600 | 77.1 | 0.00 | 1.21 | 78.32 | 16 | 10.88 | 11.81 | 17.11 | 35.71 |
| 4 | Flood Field 1 | 40 | pasture grass/rye | 508 | 133.00 | 12,071,000 | 877.7 | 0.00 | 7.56 | 885.26 | 174 | 68.00 | (3.50) | (5.07) | (10.58) |
| 5 | Pivot 2 | 120 | winter forage | 198 | 10.33 | 13,798,200 | 356.5 | 0.00 | 2.88 | 359.35 | 181 | 25.91 | (4.49) | (6.50) | (13.57) |
| 6 | Pivot 3 | 85 | winter forage | 198 | 21.50 | 4,685,300 | 187.2 | 0.00 | 1.38 | 188.59 | 95 | 12.42 | 0.19 | 0.27 | 0.56 |
| 12 | Flood Field 2 | 120 | pasture grass/rye | 503 | 18.33 | 12,927,000 | 169.4 | 27.30 | 2.70 | 199.44 | 40 | 24.27 | 8.44 | 12.23 | 25.53 |
| 15 | Flood Field 3 | 40 | alfalfa | 535 | 4.00 | 10,036,000 | 316.6 | 0.00 | 17.44 | 334.09 | 62 | 56.53 | 1.86 | 2.70 | 5.63 |

Caution: ▨ >50   ▨ >75%   ▨ >100% of yearly crop uptakable N land applied   ( ) - Negative numbers NRCS Soil Test Interpretation for N:   V. Low 0.01 - 5.0 ppm; Low 5 - 10 ppm; Moderate 10 - 30 ppm; High 30-50 ppm; V. High >50 ppm Caution: Do not apply green water on fields with very high soil N Page 1 of 2

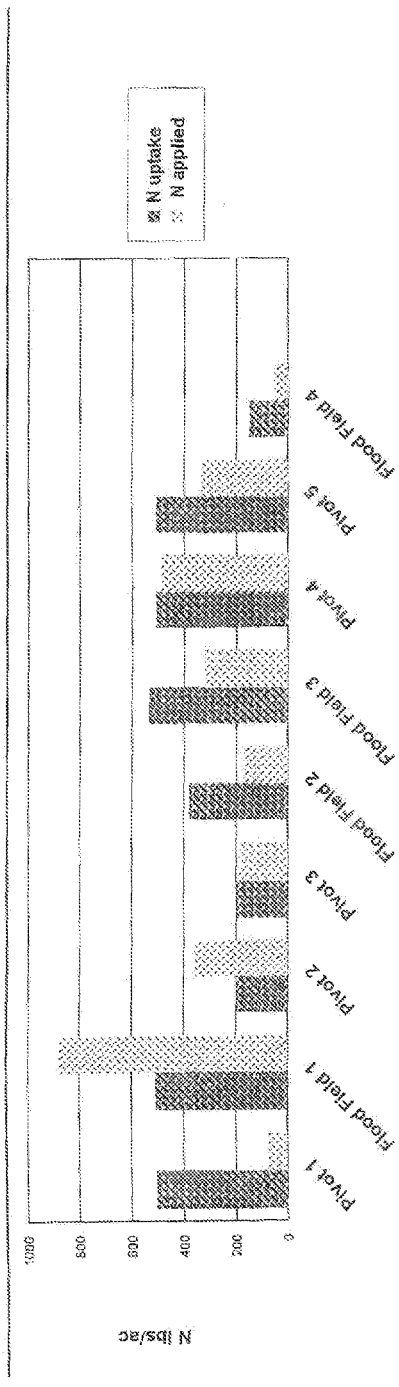

Fig. 11B

| Field # | Field Name | Ac. | Crop | Crop uptake lbs/ac/yr | Soil NO3- ppm | YTD Vol. Applied (gal) | N Applied thru Liquid Manure lbs/ac | N Applied thru Solid Manure lbs/ac | N Applied thru Fertilizer/Irr. Water lbs/ac | YTD N Applied lbs/ac | YTD N Applied % | YTD P Applied lbs/ac | Vol. of greenwater can be applied (M Gal) Barn1 | Vol. of greenwater can be applied (M Gal) Barn2 | Vol. of greenwater can be applied (M Gal) Barn3 |
|---|---|---|---|---|---|---|---|---|---|---|---|---|---|---|---|
| 17 | Pivot 4 | 125 | pasture grass/rye | 508 | 34.33 | 22,363,000 | 486.6 | 0.00 | 4.48 | 491.09 | 97 | 37.32 | 0.51 | 0.74 | 1.37 |
| 18 | Pivot 5 | 125 | pasture grass/rye | 508 | 27.67 | 20,257,500 | 335.1 | 61.70 | 4.06 | 400.83 | 79 | 33.61 | 3.24 | 4.71 | 8.68 |
| 21 | Flood Field 4 | 40 | winter forage | 150 | 52.00 | 518,800 | 49.8 | 0.00 | 0.32 | 50.11 | 33 | 2.71 | 0.97 | 1.40 | 2.59 |
| Total | | 815 | | | | 102,452,400 | | 2,856 | 89.00 | 42.62 | | | 16.07 | 23.37 | 43.08 |

* Volume of greenwater that can be applied for the remainder of the year from either Barn 1 or Barn 2 or Barn 3 based on N uptake

| Month | Lagoon TKN (mg/l) Barn1 | Lagoon TKN (mg/l) Barn2 | Lagoon TKN (mg/l) Barn3 | Avg. Lagoon P (mg/l) | Climate |
|---|---|---|---|---|---|
| Jan 2008 | 460 | 320 | 140 | 22 | |
| Feb 2008 | 470 | 360 | 150 | 23 | |
| Mar 2008 | 510 | 370 | 160 | 20 | |
| Apr 2008 | 550 | 400 | 150 | 22 | |
| May 2008 | 590 | 400 | 160 | 24 | |
| Jun 2008 | 590 | 350 | 200 | 26 | |
| Jul 2008 | 450 | 300 | 240 | 28 | |
| Aug 2008 | 350 | 230 | 280 | 25 | Hail storm |
| Sep 2008 | | | | | |
| Oct 2008 | | | | | |
| Nov 2008 | | | | | |
| Dec 2008 | | | | | |

| | Discharge (Mgal) Barn1 | Discharge (Mgal) Barn2 | Discharge (Mgal) Barn3 |
|---|---|---|---|
| Permitted greenwater discharge from Barn to Lagoon (gal/year) | 63.87 | 63.87 | 100.37 |
| YTD actual greenwater discharge from Barn to Lagoon | 9.59 | 50.56 | 42.30 |
| Amount of GW to be managed for the remainder of year based on permitted volumes | 54.28 | 13.31 | 58.07 |
| % permitted greenwater discharge | 15.01 | 79.15 | 42.15 |
| Projected Avg. Annual greenwater discharge based on historic data | 57.89 | 54.48 | 95.18 |
| Projected amount of GW to be managed for the remainder of year based on historic data | 46.3 | 3.92 | 42.88 |

Alerts: Hail storm damaged 40 acres of cropland in Field #12, crop uptake was accordingly adjusted to 380 lbs/ac/yr
You have applied greenwater on fields #4 and #21 with very high soil nitrogen. Please avoid further applications on these fields.
Note: Vol. of max. allowable greenwater that can be applied varies with the barn used for irrigation since TKN is different for each barn Caution: ▓ >50  ▓ >75%  ▓ >100%  of yearly crop uptakable N land applied    ( ) - Negative numbers NRCS Soil Test Interpretation for N:    V. Low 0.01 - 5.0 ppm; Low 5 - 10 ppm; Moderate: 10 - 30 ppm; High 30-50 ppm; V. High >50 ppm Caution: Do not apply green water on fields with very high soil N

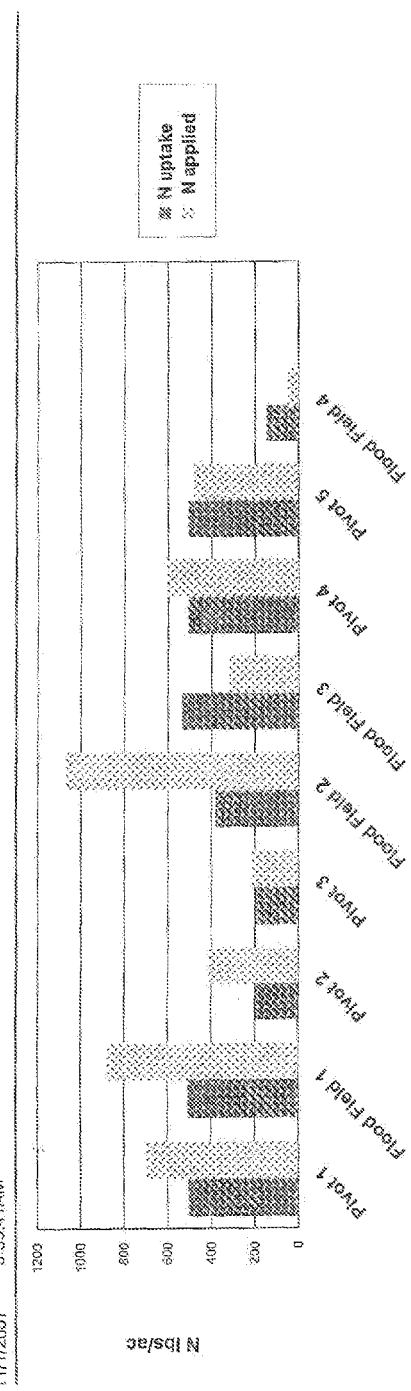

Fig. 13B

| Field # | Field Name | AC | Crop | Crop uptake lbs/ac/yr | Soil NO3 ppm | YTD Vol applied (Gal) | YTD N Applied thru | | | YTD N Applied lbs/ac | YTD P Applied lbs/ac | Vol. of greenwater that can be applied (M Gal) | | |
|---|---|---|---|---|---|---|---|---|---|---|---|---|---|---|
| | | | | | | | Liquid Manure lbs/ac | Solid Manure lbs/ac | Fertilizer/ Water lbs/ac | | | Barn1 | Barn2 | Barn3 |
| 17 | Pivot 4 | 125 | pasture grass/rye | 508 | 34.33 | 33,820,000 | 603.4 | 0.00 | 6.77 | 610.19 | 120 | 49.67 | (3.26) | (4.81) | (7.89) |
| 19 | Pivot 5 | 125 | pasture grass/rye | 508 | 27.57 | 27,038,500 | 484.0 | 61.70 | 5.42 | 551.13 | 108 | 39.71 | (1.37) | (2.03) | (3.33) |
| 21 | Flood Field 4 | 40 | winter forage | 150 | 52.00 | 518,800 | 49.8 | | 0.32 | 50.11 | 33 | 2.38 | 1.02 | 1.51 | 2.47 |
| Total | | 815 | | | | 180,492,300 | 4,724.0 | 69.00 | 58.26 | | | | (40.81) | (60.32) | (98.87) |

* Volume of greenwater that can be applied for the remainder of the year from either Barn 1 or Barn 2 or Barn 3 based on N uptake

| Month | Lagoon TKN (mg/l) | | | Avg Lagoon P (mg/l) | Climate |
|---|---|---|---|---|---|
| | Barn1 | Barn2 | Barn3 | | |
| Jan 2008 | 460 | 320 | 140 | 22 | |
| Feb 2008 | 470 | 360 | 150 | 23 | |
| Mar 2008 | 510 | 370 | 160 | 20 | |
| Apr 2008 | 550 | 400 | 150 | 22 | |
| May 2008 | 580 | 400 | 160 | 24 | |
| Jun 2008 | 590 | 350 | 200 | 26 | |
| Jul 2008 | 450 | 300 | 240 | 28 | |
| Aug 2008 | 350 | 230 | 280 | 25 | Hail storm |
| Sep 2008 | 360 | 230 | 260 | 24 | 2.9" Rainfall |
| Oct 2008 | 370 | 220 | 200 | 22 | |
| Nov 2008 | | | | | |
| Dec 2008 | | | | | |

| | Discharge (M Gal) | | |
|---|---|---|---|
| | Barn1 | Barn2 | Barn3 |
| Permitted greenwater discharge from Barn to Lagoons per year | 63.87 | 63.87 | 100.37 |
| YTD actual greenwater discharge from barn to Lagoon | 49.63 | 67.49 | 63.37 |
| Amount of GW to be managed for remainder of year based on permitted volumes | 14.24 | (3.62) | 37.0 |
| % permitted greenwater discharge | 77.7 | 105.66 | 63.13 |
| Projected YT Annual greenwater discharge based on historic data | 65.89 | 62.31 | 90.87 |
| Projected amount of GW to be managed for the remainder of year based on historic data | 16.26 | (5.18) | 27.5 |

Alerts: ▓ You have exceeded your permitted discharge from Barn 2 by 3.62 M Gal and you are approaching Barn 1 maximum permitted discharge
You have applied greenwater on fields #4 and #21 with very high soil nitrogen. Please avoid further applications on these fields.
Note: Vol. of max. allowable greenwater that can be applied varies with the barn used for irrigation since TKN is different for each barn Caution: ▓ >50   ▓ >75%   ▓ >100%   of yearly crop uptakable N land applied      ( ) - Negative numbers
NRCS Soil Test Interpretation for N:   V. Low 0.01 - 5.0 ppm; Low 5 - 10 ppm; Moderate: 10 - 30 ppm; High 30-50 ppm; V. High >50 ppm
Caution:   Do not apply green water on fields with very high soil N Page 2 of 2

Fig. 14B

| Field # | Field Name | Ac | Crop | Soil NO3- | YTD Vol applied | YTD N Applied thru | | | YTD N Applied | YTD P Applied | Vol. of greenwater that can be applied (M Gal) | | |
|---|---|---|---|---|---|---|---|---|---|---|---|---|---|
| | | | | | | Liquid Manure | Solid Manure | Fertilizer/ Irr. Water | | | N Based | | |
| | | | | ppm | (gal) | lbs/ac | lbs/ac | lbs/ac | lbs/ac | lbs/ac | Barn1 | Barn2 | Barn3 |
| 17 | Pivot 4 | 125 | pasture grass/rye | 34.33 | 36,314,000 | 750.1 | 3.00 | 7.27 | 757.34 | 149 | 53.34 | (8.10) | (12.13) | (19.25) |
| 18 | Pivot 5 | 125 | pasture grass/rye | 27.67 | 44,783,500 | 1,030.2 | 61.70 | 8.97 | 1,100.83 | 217 | 65.78 | (19.26) | (28.83) | (45.77) |
| 21 | Flood Field 4 | 40 | winter forage | 53.60 | 518,800 | 49.8 | | 0.32 | 50.11 | 33 | 2.38 | 1.04 | 1.55 | 2.47 |
| Total | | 815 | | | 201,792,300 | 5,417.0 | 89.00 | 62.50 | | | | (64.26) | (98.18) | (152.69) |

* Volume of greenwater that can be applied for the remainder of the year from either Barn 1 or Barn 2 or Barn 3 based on N uptake

| Month | Lagoon TKN (mg/l) | | | App. Lagoon #/ mo/in | Climate | | Discharge (M Gal) | | |
|---|---|---|---|---|---|---|---|---|---|
| | Barn1 | Barn2 | Barn3 | | | | Barn1 | Barn2 | Barn3 |
| Jan 2008 | 460 | 320 | 140 | 22 | | Permitted greenwater discharge from Barn 1 to Lagoon, per yr. | 63.87 | 63.87 | 100.37 |
| Feb 2008 | 470 | 360 | 150 | 23 | | | | | |
| Mar 2008 | 510 | 370 | 160 | 20 | | YTD actual greenwater discharge from Barn to Lagoon | 67.37 | 69.99 | 64.43 |
| Apr 2008 | 550 | 400 | 150 | 22 | | | | | |
| May 2008 | 590 | 400 | 160 | 24 | | Amount of GW to be managed for the remainder of year based on permitted volumes | (3.5) | (6.12) | 35.94 |
| Jun 2008 | 590 | 350 | 200 | 26 | | | | | |
| Jul 2008 | 450 | 300 | 240 | 28 | | | | | |
| Aug 2008 | 350 | 230 | 280 | 25 | Hail storm | Permitted greenwater discharge | 105.48 | 109.57 | 64.19 |
| Sep 2008 | 360 | 230 | 260 | 24 | 2.9" Rainfall | Projected M/l Annual greenwater discharge based on historic data | 65.89 | 62.31 | 90.87 |
| Oct 2008 | 370 | 220 | 200 | 22 | | | | | |
| Nov 2008 | 370 | 210 | 190 | 22 | | Projected amount of GW to be managed for the remainder of year based on historical data | (1.48) | (7.68) | 26.44 |
| Dec 2008 | | | | | | | | | |

Alerts: You have exceeded your permitted discharge from Barn 1 by 3.5 M Gal and Barn 2 by 6.12 M Gal
You have applied greenwater on fields #4 and #21 with very high soil nitrogen. Please avoid further applications on these fields.
Note: Vol. of max. allowable greenwater that can be applied varies with the barn used for irrigation since TKN is different for each barn Caution:  ▓ >50    ▓ >75%    ▓ >100% of yearly crop uptakable N land applied    ( ) - Negative numbers NRCS Soil Test Interpretation for N:   V. Low 0.01 - 5.0 ppm;   Low 5 - 10 ppm;   Moderate: 10 - 30 ppm;   High 30-50 ppm;   V. High >50 ppm
Caution:  Do not apply green water on fields with very high soil N

Fig 15B

| Field # | Field Name | Ac | Crop | Crop uptake lbs/ac/yr | Soil NO3 ppm | YTD Vol. applied (gal) | YTD N Applied thru Liquid Manure lbs/ac | YTD N Applied thru Solid Manure lbs/ac | YTD N Applied thru Fertilizer Mn./Waste lbs/ac | YTD N Applied thru Total lbs/ac | % | YTD P Applied lbs/ac | Vol. of greenwater that can be applied (M Gal) Barn1 | Barn2 | Barn3 N Based |
|---|---|---|---|---|---|---|---|---|---|---|---|---|---|---|---|
| 17 | Pivot 4 | 125 | pasture grass/rye | 508 | 34.33 | 36,314,000 | 750.1 | 0.00 | 7.27 | 757.34 | 149 | 48.49 | (8.24) | (12.49) | (19.35) |
| 18 | Pivot 5 | 125 | pasture grass/rye | 508 | 27.67 | 44,783,500 | 1,030.2 | 61.70 | 8.97 | 1,100.83 | 217 | 59.50 | (19.60) | (29.70) | (46.01) |
| 21 | Flood Field 4 | 40 | winter forage | 150 | 52.00 | 518,800 | 49.8 | 0.32 | 50.11 | 33 | 2.16 | 1.06 | 1.80 | 2.48 |
| Total | | 815 | | | | 281,792,300 | | 5,431.0 | 89.00 | 62.53 | | | (65.85) | (99.76) | (154.55) |

* Volume of greenwater that can be applied for the remainder of the year from either Barn 1 or Barn 2 or Barn 3 based on N uptake

| Month | Lagoon TKN (mg/L) Barn1 | Barn2 | Barn3 | Avg rainfall (in.) | Adverse Climate | | Discharge (M Gal) Barn1 | Barn2 | Barn3 |
|---|---|---|---|---|---|---|---|---|---|
| Jan 2008 | 460 | 320 | 140 | 22 | | Permitted greenwater discharge from Barn to Lagoon per year | 63.87 | 63.87 | 100.37 |
| Feb 2008 | 470 | 360 | 150 | 23 | | | | | |
| Mar 2008 | 510 | 370 | 160 | 20 | | YTD actual greenwater discharge from Barn to Lagoon | 67.37 | 69.99 | 64.43 |
| Apr 2008 | 550 | 400 | 150 | 22 | | | | | |
| May 2008 | 590 | 400 | 160 | 24 | | Amount of GW to be managed for the remainder of year based on permitted volumes | (3.5) | (6.12) | 35.94 |
| Jun 2008 | 590 | 350 | 200 | 26 | | | | | |
| Jul 2008 | 450 | 300 | 240 | 28 | | | | | |
| Aug 2008 | 350 | 230 | 280 | 25 | Hail storm | % permitted greenwater discharge | 105.48 | 103.57 | 64.19 |
| Sep 2008 | 360 | 230 | 260 | 24 | 2.9" Rainfall | Projected avg. Annual greenwater discharge based on historic data | 65.89 | 62.31 | 90.67 |
| Oct 2008 | 370 | 220 | 200 | 22 | | | | | |
| Nov 2008 | 370 | 210 | 190 | 22 | | Projected amount of GW to be managed for the remainder of year based on historic data | (1.48) | (7.68) | 26.44 |
| Dec 2008 | 360 | 200 | 180 | 20 | | | | | |

Alerts: You have exceeded your permitted discharge from Barn 1 by 3.5 M Gal and Barn 2 by 6.12 M Gal
You have applied greenwater on fields #4 and #21 with very high soil nitrogen. Please avoid further applications on these fields.
Note: Vol. of max. allowable greenwater that can be applied varies with the barn used for irrigation since TKN is different for each barn Caution: ▓ >50  ▓ >75%  ▓ >100% of yearly crop uptakable N land applied   ( ) - Negative numbers
NRCS Soil Test Interpretation for N: V. Low 0.01 - 5.0 ppm; Low 5 - 10 ppm; Moderate: 10 - 30 ppm; High 30-50 ppm; V. High >50 ppm
Caution: Do not apply green water on fields with very high soil N

*Example Dairy*  Fig. 16

Freshwater Application Report
January 2007 (Beginning of year report)
2/5/2007    10:11:20AM

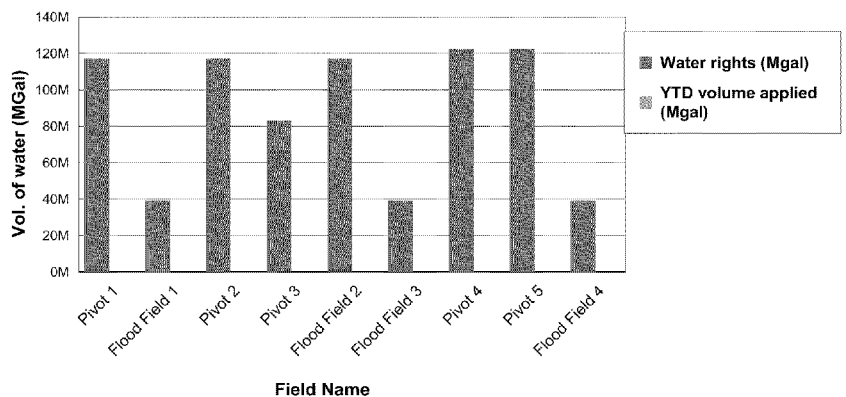

| Field # | Field Name | Ac | Crop | water rights ac-ft | #of Irrigations | YTD vol. applied gal | | N applied lbs/a | Vol. remaining* gal |
|---|---|---|---|---|---|---|---|---|---|
| | | | | | | | % | | |
| 3 | Pivot 1 | 120 | pasture grass/rye | 360 | 0 | 0 | 0 | 0.00 | 117,306,360 |
| 4 | Flood Field 1 | 40 | pasture grass/rye | 120 | 0 | 0 | 0 | 0.00 | 39,102,120 |
| 5 | Pivot 2 | 120 | winter forage | 360 | 0 | 0 | 0 | 0.00 | 117,306,360 |
| 6 | Pivot 3 | 85 | winter forage | 255 | 0 | 0 | 0 | 0.00 | 83,092,005 |
| 12 | Flood Field 2 | 120 | pasture grass/rye | 360 | 0 | 0 | 0 | 0.00 | 117,306,360 |
| 15 | Flood Field 3 | 40 | alfalfa | 120 | 0 | 0 | 0 | 0.00 | 39,102,120 |
| 17 | Pivot 4 | 125 | pasture grass/rye | 375 | 0 | 0 | 0 | 0.00 | 122,194,125 |
| 18 | Pivot 5 | 125 | pasture grass/rye | 375 | 0 | 0 | 0 | 0.00 | 122,194,125 |
| 21 | Flood Field 4 | 40 | winter forage | 120 | 0 | 0 | 0 | 0.00 | 39,102,120 |
| Total | | 815 | | 2,445 | | 0 | | | 796,705,695 |

* Volume of irrigation water that can be applied for the remainder of the year

Caution:   >50   >75   >100% of irrigation water rights utilized

*Example Dairy*

Freshwater Application Report

Fig. 17

NUTRIENT APPLICATION FORECASTING SYSTEM
NAFS©

Page 30/41

January 2007 through January 2007

2/5/2007    10:12:27AM

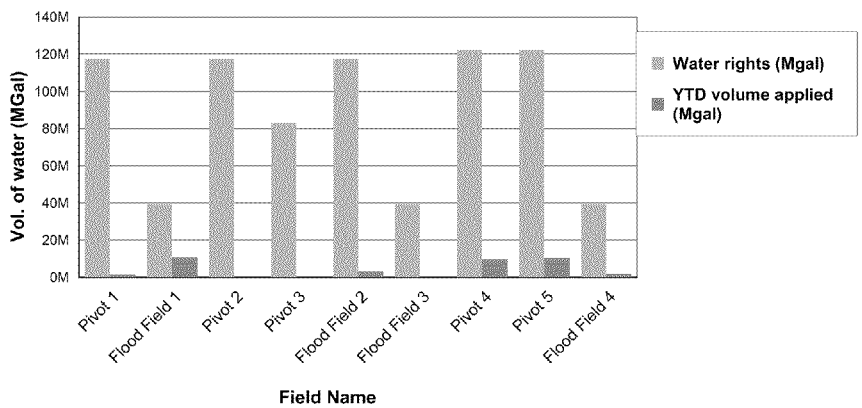

Field Name

| Field # | Field Name | Ac | Crop | water rights ac-ft | # of Irrigations | YTD vol. applied gal | N applied % | lbs/a | Vol. remaining* gal |
|---|---|---|---|---|---|---|---|---|---|
| 3 | Pivot 1 | 120 | pasture grass/rye | 360 | 1 | 1,222,800 | 1 | 0.09 | 116,083,560 |
| 4 | Flood Field 1 | 40 | pasture grass/rye | 120 | 1 | 10,821,000 | 28 | 2.26 | 28,281,120 |
| 5 | Pivot 2 | 120 | winter forage | 360 | 0 | 0 | 0 | 0.00 | 117,306,360 |
| 6 | Pivot 3 | 85 | winter forage | 255 | 0 | 0 | 0 | 0.00 | 83,092,005 |
| 12 | Flood Field 2 | 120 | pasture grass/rye | 360 | 1 | 3,000,000 | 3 | 0.21 | 114,306,360 |
| 15 | Flood Field 3 | 40 | alfalfa | 120 | 0 | 0 | 0 | 0.00 | 39,102,120 |
| 17 | Pivot 4 | 125 | pasture grass/rye | 375 | 1 | 9,765,000 | 8 | 0.65 | 112,429,125 |
| 18 | Pivot 5 | 125 | pasture grass/rye | 375 | 2 | 10,355,700 | 8 | 0.69 | 111,838,425 |
| 21 | Flood Field 4 | 40 | winter forage | 120 | 1 | 1,556,400 | 4 | 0.32 | 37,545,720 |
| Total | | 815 | | 2,445 | | 36,720,900 | | | 759,984,795 |

* Volume of irrigation water that can be applied for the remainder of the year

Caution:    ■ >50    ▨ >75%    ■ >100%  of irrigation water rights utilized

Page 1 of 1

*Example Dairy*      Fig. 18     NUTRIENT APPLICATION FORECASTING SYSTEM NAFS©

Freshwater Application Report
January 2007 through February 2007
3/3/2007   10:13:32AM

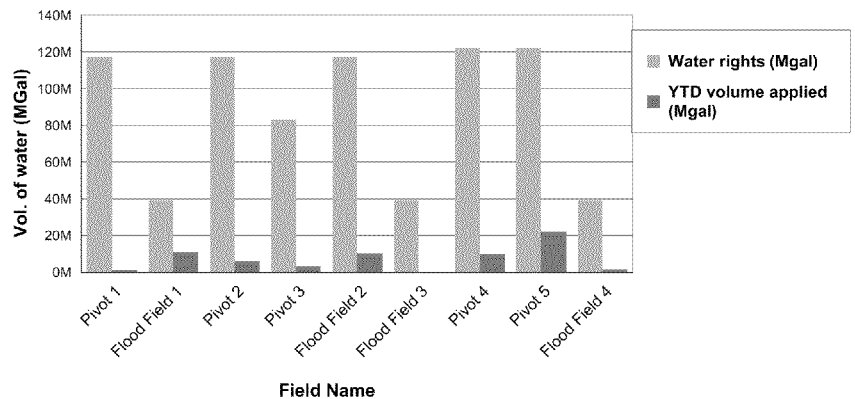

| Field # | Field Name | Ac | Crop | water rights | #of Irrigations | YTD vol. applied | | N applied | Vol. remaining* |
|---|---|---|---|---|---|---|---|---|---|
| | | | | ac-ft | | gal | % | lbs/a | gal |
| 3 | Pivot 1 | 120 | pasture grass/rye | 360 | 1 | 1,222,800 | 1 | 0.09 | 116,083,560 |
| 4 | Flood Field 1 | 40 | pasture grass/rye | 120 | 1 | 10,821,000 | 28 | 2.26 | 28,281,120 |
| 5 | Pivot 2 | 120 | winter forage | 360 | 2 | 5,883,600 | 60 | 0.41 | 111,422,760 |
| 6 | Pivot 3 | 85 | winter forage | 255 | 1 | 3,172,500 | 4 | 0.31 | 79,919,505 |
| 12 | Flood Field 2 | 120 | pasture grass/rye | 360 | 2 | 10,263,000 | 9 | 0.71 | 107,043,360 |
| 15 | Flood Field 3 | 40 | alfalfa | 120 | 0 | 0 | 0 | 0.00 | 39,102,120 |
| 17 | Pivot 4 | 125 | pasture grass/rye | 375 | 1 | 9,765,000 | 8 | 0.65 | 112,429,125 |
| 18 | Pivot 5 | 125 | pasture grass/rye | 375 | 3 | 21,929,700 | 18 | 1.46 | 100,264,425 |
| 21 | Flood Field 4 | 40 | winter forage | 120 | 1 | 1,556,400 | 4 | 0.32 | 37,545,720 |
| Total | | 815 | | 2,445 | | 64,614,000 | | | 732,091,695 |

* Volume of irrigation water that can be applied for the remainder of the year

Caution:  ▇ >50   ▇ >75%   ▇ >100%  of irrigation water rights utilized

Page 1 of 1

*Example Dairy*

Fig. 19

NUTRIENT APPLICATION FORECASTING SYSTEM
NAFS©

Page32/41

Freshwater Application Report
January 2007 through March 2007
4/8/2007    10:22:44AM

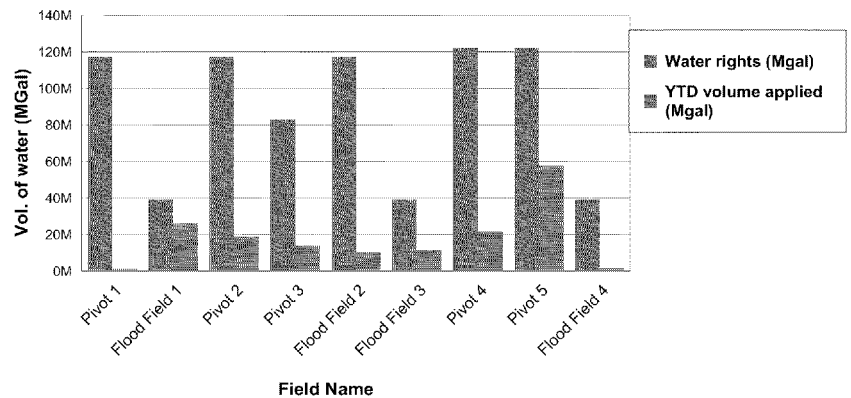

| Field # | Field Name | Ac | Crop | water rights ac-ft | # of Irrigations | YTD vol. applied gal | % | N applied lbs/a | Vol. remaining* gal |
|---|---|---|---|---|---|---|---|---|---|
| 3 | Pivot 1 | 120 | pasture grass/rye | 360 | 1 | 1,222,800 | 1 | 0.09 | 116,083,560 |
| 4 | Flood Field 1 | 40 | pasture grass/rye | 120 | 2 | 26,421,000 | 68 | 5.51 | 12,681,120 |
| 5 | Pivot 2 | 120 | winter forage | 360 | 4 | 19,095,600 | 16 | 1.33 | 98,210,760 |
| 6 | Pivot 3 | 85 | winter forage | 255 | 3 | 14,006,100 | 17 | 1.38 | 69,085,905 |
| 12 | Flood Field 2 | 120 | pasture grass/rye | 360 | 2 | 10,263,000 | 9 | 0.71 | 107,043,360 |
| 15 | Flood Field 3 | 40 | alfalfa | 120 | 0 | 11,589,000 | 30 | 2.42 | 27,513,120 |
| 17 | Pivot 4 | 125 | pasture grass/rye | 375 | 3 | 21,666,000 | 18 | 1.45 | 100,528,125 |
| 18 | Pivot 5 | 125 | pasture grass/rye | 375 | 5 | 57,681,300 | 47 | 3.85 | 64,512,825 |
| 21 | Flood Field 4 | 40 | winter forage | 120 | 1 | 1,556,400 | 4 | 0.32 | 37,545,720 |
| Total | | 815 | | | 2,445 | 163,501,200 | | | 633,204,495 |

* Volume of irrigation water that can be applied for the remainder of the year

Caution: ▓ >50   ▒ >75%   ▓ >100%   of irrigation water rights utilized

Page 1 of 1

*Example Dairy*

Fig. 20

NUTRIENT APPLICATION FORECASTING SYSTEM
NAFS©

Freshwater Application Report
January 2007 through April 2007
5/8/2007    10:15:08AM

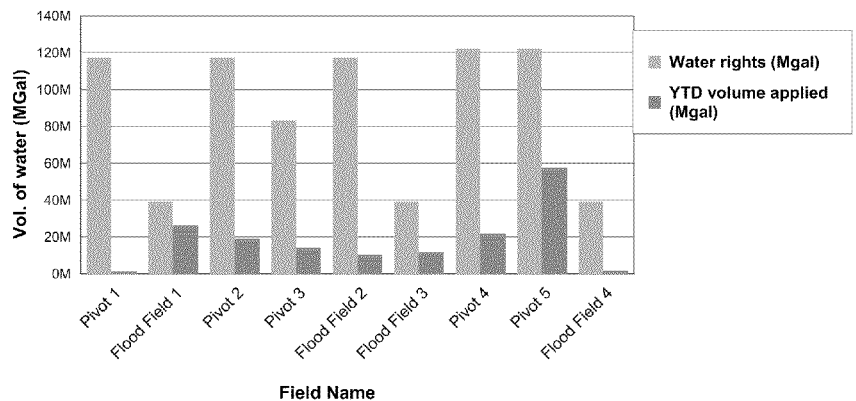

| Field # | Field Name | Ac | Crop | water rights ac-ft | #of Irrigations | YTD vol. applied gal | % | N applied lbs/a | Vol. remaining* gal |
|---|---|---|---|---|---|---|---|---|---|
| 3 | Pivot 1 | 120 | pasture grass/rye | 360 | 1 | 1,222,800 | 1 | 0.09 | 116,083,560 |
| 4 | Flood Field 1 | 40 | pasture grass/rye | 120 | 2 | 26,421,000 | 68 | 5.51 | 12,681,120 |
| 5 | Pivot 2 | 120 | winter forage | 360 | 4 | 19,095,600 | 16 | 1.33 | 98,210,760 |
| 6 | Pivot 3 | 85 | winter forage | 255 | 3 | 14,006,100 | 17 | 1.38 | 69,085,905 |
| 12 | Flood Field 2 | 120 | pasture grass/rye | 360 | 2 | 10,263,000 | 9 | 0.71 | 107,043,360 |
| 15 | Flood Field 3 | 40 | alfalfa | 120 | 0 | 11,589,000 | 30 | 2.42 | 27,513,120 |
| 17 | Pivot 4 | 125 | pasture grass/rye | 375 | 3 | 21,666,000 | 18 | 1.45 | 100,528,125 |
| 18 | Pivot 5 | 125 | pasture grass/rye | 375 | 5 | 57,681,300 | 47 | 3.85 | 64,512,825 |
| 21 | Flood Field 4 | 40 | winter forage | 120 | 1 | 1,556,400 | 4 | 0.32 | 37,545,720 |
| Total | | 815 | | 2,445 | | 163,501,200 | | | 633,204,495 |

* Volume of irrigation water that can be applied for the remainder of the year

Caution: ▓ >50    ▓ >75%    ▓ >100% of irrigation water rights utilized

*Example Dairy*   Fig. 21   NUTRIENT APPLICATION FORECASTING SYSTEM NAFS©

Freshwater Application Report
January 2007 through May 2007
6/5/2007    10:15:54AM

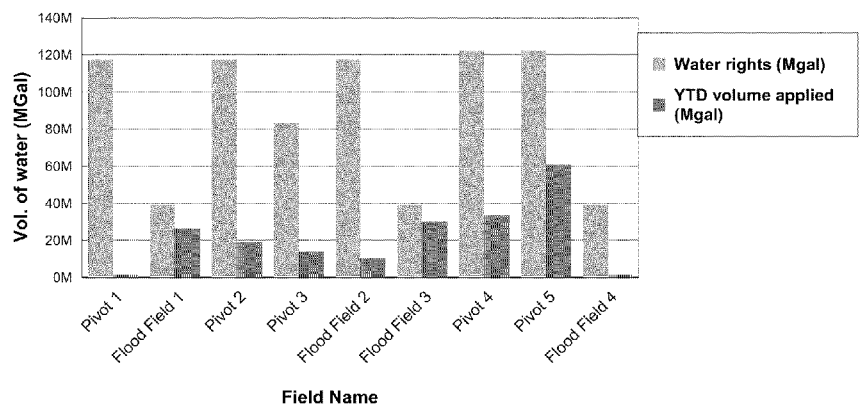

Field Name

| Field # | Field Name | Ac | Crop | water rights (ac-ft) | # of Irrigations | YTD vol. applied (gal) | % | N applied (lbs/a) | Vol. remaining* (gal) |
|---|---|---|---|---|---|---|---|---|---|
| 3 | Pivot 1 | 120 | pasture grass/rye | 360 | 1 | 1,222,800 | 1 | 0.09 | 116,083,560 |
| 4 | Flood Field 1 | 40 | pasture grass/rye | 120 | 2 | 26,421,000 | 68 | 5.51 | 12,681,120 |
| 5 | Pivot 2 | 120 | winter forage | 360 | 4 | 19,095,600 | 16 | 1.33 | 98,210,760 |
| 6 | Pivot 3 | 85 | winter forage | 255 | 4 | 14,055,900 | 17 | 1.38 | 69,036,105 |
| 12 | Flood Field 2 | 120 | pasture grass/rye | 360 | 2 | 10,263,000 | 9 | 0.71 | 107,043,360 |
| 15 | Flood Field 3 | 40 | alfalfa | 120 | 2 | 30,108,000 | 77 | 6.28 | 8,994,120 |
| 17 | Pivot 4 | 125 | pasture grass/rye | 375 | 4 | 33,474,000 | 27 | 2.23 | 88,720,125 |
| 18 | Pivot 5 | 125 | pasture grass/rye | 375 | 6 | 60,772,500 | 50 | 4.06 | 61,421,625 |
| 21 | Flood Field 4 | 40 | winter forage | 120 | 1 | 1,556,400 | 4 | 0.32 | 37,545,720 |
| Total | | 815 | | 2,445 | | 196,969,200 | | | 599,736,495 |

* Volume of irrigation water that can be applied for the remainder of the year

Caution:  >50   >75   >100% of irrigation water rights utilized

Page 1 of 1

*Example Dairy*

Fig. 22

NUTRIENT APPLICATION FORECASTING SYSTEM
NAFS©

Page 35/41

Freshwater Application Report
January 2007 through June 2007
7/2/2007   10:16:53AM

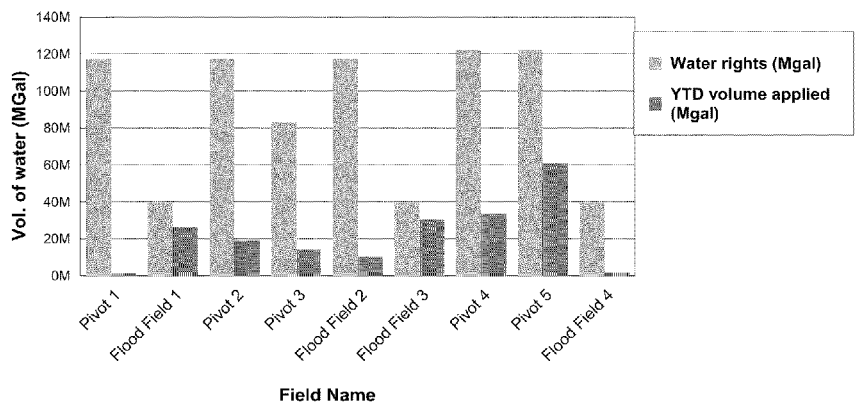

Field Name

| Field # | Field Name | Ac | Crop | water rights ac-ft | # of Irrigations | YTD vol applied gal | % | N applied lbs/a | Vol. remaining* gal |
|---|---|---|---|---|---|---|---|---|---|
| 3 | Pivot 1 | 120 | pasture grass/rye | 360 | 1 | 1,222,800 | 1 | 0.09 | 116,083,560 |
| 4 | Flood Field 1 | 40 | pasture grass/rye | 120 | 3 | 26,421,000 | 68 | 5.51 | 12,681,120 |
| 5 | Pivot 2 | 120 | winter forage | 360 | 4 | 19,095,600 | 16 | 1.33 | 98,210,760 |
| 6 | Pivot 3 | 85 | winter forage | 255 | 4 | 14,055,900 | 17 | 1.38 | 69,036,105 |
| 12 | Flood Field 2 | 120 | pasture grass/rye | 360 | 2 | 10,263,000 | 9 | 0.71 | 107,043,360 |
| 15 | Flood Field 3 | 40 | alfalfa | 120 | 2 | 30,108,000 | 77 | 6.28 | 8,994,120 |
| 17 | Pivot 4 | 125 | pasture grass/rye | 375 | 4 | 33,474,000 | 27 | 2.23 | 88,720,125 |
| 18 | Pivot 5 | 125 | pasture grass/rye | 375 | 6 | 60,772,500 | 50 | 4.06 | 61,421,625 |
| 21 | Flood Field 4 | 40 | winter forage | 120 | 1 | 1,556,400 | 4 | 0.32 | 37,545,720 |
| Total | | 815 | | 2,445 | | 196,969,200 | | | 599,736,495 |

* Volume of irrigation water that can be applied for the remainder of the year

Caution:   >50   >75%   >100% of irrigation water rights utilized

*Example Dairy*

Fig. 23

NUTRIENT APPLICATION FORECASTING SYSTEM
NAFS©

Page 36/41

Freshwater Application Report

January 2007 through July 2007

8/2/2007   10:17:37AM

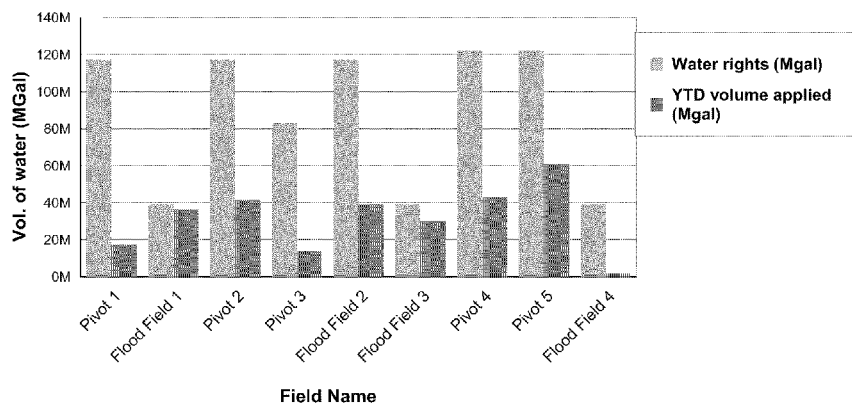

Field Name

| Field # | Field Name | Ac | Crop | water rights ac-ft | #of Irrigations | YTD vol. applied gal | % | N applied lbs/a | Vol. remaining* gal |
|---|---|---|---|---|---|---|---|---|---|
| 3 | Pivot 1 | 120 | pasture grass/rye | 360 | 4 | 17,386,800 | 15 | 1.21 | 99,919,560 |
| 4 | Flood Field 1 | 40 | pasture grass/rye | 120 | 5 | 36,213,000 | 93 | 7.56 | 2,889,120 |
| 5 | Pivot 2 | 120 | winter forage | 360 | 6 | 41,394,600 | 35 | 2.88 | 75,911,760 |
| 6 | Pivot 3 | 85 | winter forage | 255 | 4 | 14,055,900 | 17 | 1.38 | 69,036,105 |
| 12 | Flood Field 2 | 120 | pasture grass/rye | 360 | 5 | 38,781,000 | 33 | 2.70 | 78,525,360 |
| 15 | Flood Field 3 | 40 | alfalfa | 120 | 5 | 30,108,000 | 77 | 6.28 | 8,994,120 |
| 17 | Pivot 4 | 125 | pasture grass/rye | 375 | 6 | 42,807,000 | 35 | 2.86 | 79,387,125 |
| 18 | Pivot 5 | 125 | pasture grass/rye | 375 | 6 | 60,772,500 | 50 | 4.06 | 61,421,625 |
| 21 | Flood Field 4 | 40 | winter forage | 120 | 1 | 1,556,400 | 4 | 0.32 | 37,545,720 |
| Total | | 815 | | 2,445 | | 283,075,200 | | | 513,630,495 |

* Volume of irrigation water that can be applied for the remainder of the year

Caution:   >50   >75   >100% of irrigation water rights utilized

*Example Dairy*

Fig. 24

NUTRIENT APPLICATION FORECASTING SYSTEM
NAFS©

Freshwater Application Report
January 2007 through August 2007
9/1/2007    10:18:13AM

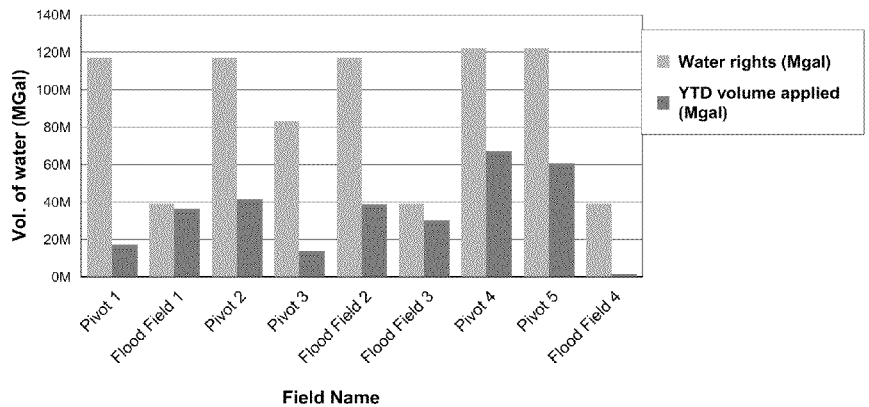

Field Name

| Field # | Field Name | Ac | Crop | water rights ac-ft | # of Irrigations | YTD vol. applied gal | YTD vol. applied % | N applied lbs/a | Vol. remaining* gal |
|---|---|---|---|---|---|---|---|---|---|
| 3 | Pivot 1 | 120 | pasture grass/rye | 360 | 4 | 17,386,800 | 15 | 1.21 | 99,919,560 |
| 4 | Flood Field 1 | 40 | pasture grass/rye | 120 | 5 | 36,213,000 | 93 | 7.56 | 2,889,120 |
| 5 | Pivot 2 | 120 | winter forage | 360 | 6 | 41,394,600 | 35 | 2.88 | 75,911,760 |
| 6 | Pivot 3 | 85 | winter forage | 255 | 4 | 14,055,900 | 17 | 1.38 | 69,036,105 |
| 12 | Flood Field 2 | 120 | pasture grass/rye | 360 | 5 | 38,781,000 | 33 | 2.70 | 78,525,360 |
| 15 | Flood Field 3 | 40 | alfalfa | 120 | 5 | 30,108,000 | 77 | 6.28 | 8,994,120 |
| 17 | Pivot 4 | 125 | pasture grass/rye | 375 | 8 | 67,089,000 | 55 | 4.48 | 55,105,125 |
| 18 | Pivot 5 | 125 | pasture grass/rye | 375 | 6 | 60,772,500 | 50 | 4.06 | 61,421,625 |
| 21 | Flood Field 4 | 40 | winter forage | 120 | 1 | 1,556,400 | 4 | 0.32 | 37,545,720 |
| Total | | 815 | | 2,445 | | 307,357,200 | | | 489,348,495 |

* Volume of irrigation water that can be applied for the remainder of the year

Caution:   >50   >75   >100% of irrigation water rights utilized

Page 1 of 1

*Example Dairy*

Fig. 25

NUTRIENT APPLICATION FORECASTING SYSTEM
NAFS©

Freshwater Application Report
January 2007 through September 2007
10/2/2007    10:18:49AM

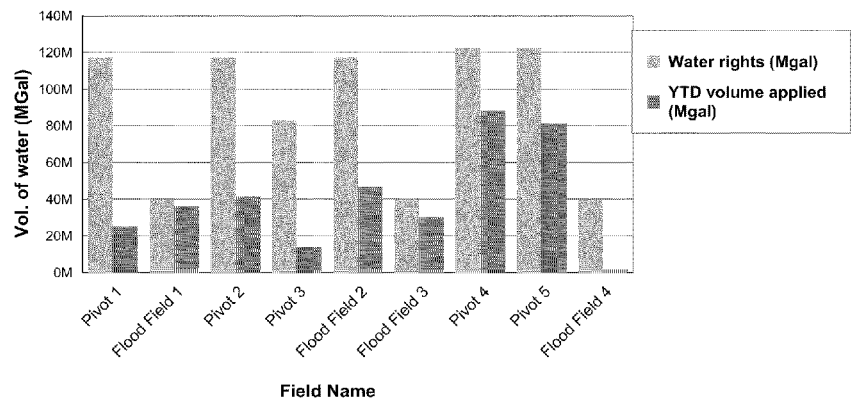

Field Name

| Field # | Field Name | Ac | Crop | water rights ac-ft | # of Irrigations | YTD vol. applied gal | % | N applied lbs/a | Vol. remaining* gal |
|---|---|---|---|---|---|---|---|---|---|
| 3 | Pivot 1 | 120 | pasture grass/rye | 360 | 6 | 24,997,800 | 21 | 1.74 | 92,308,560 |
| 4 | Flood Field 1 | 40 | pasture grass/rye | 120 | 5 | 36,213,000 | 93 | 7.56 | 2,889,120 |
| 5 | Pivot 2 | 120 | winter forage | 360 | 6 | 41,394,600 | 35 | 2.88 | 75,911,760 |
| 6 | Pivot 3 | 85 | winter forage | 255 | 4 | 14,055,900 | 17 | 1.38 | 69,036,105 |
| 12 | Flood Field 2 | 120 | pasture grass/rye | 360 | 7 | 46,578,000 | 40 | 3.24 | 70,728,360 |
| 15 | Flood Field 3 | 40 | alfalfa | 120 | 5 | 30,108,000 | 77 | 6.28 | 8,994,120 |
| 17 | Pivot 4 | 125 | pasture grass/rye | 375 | 10 | 87,984,000 | 72 | 5.87 | 34,210,125 |
| 18 | Pivot 5 | 125 | pasture grass/rye | 375 | 8 | 81,115,500 | 66 | 5.42 | 41,078,625 |
| 21 | Flood Field 4 | 40 | winter forage | 120 | 1 | 1,556,400 | 4 | 0.32 | 37,545,720 |
| Total | | 815 | | 2,445 | | 364,003,200 | | | 432,702,495 |

* Volume of irrigation water that can be applied for the remainder of the year

Caution:   ▓ >50    ▓ >75%    ▓ >100%  of irrigation water rights utilized

*Example Dairy*

Fig. 26

NUTRIENT APPLICATION FORECASTING SYSTEM
NAFS©

Page 39/41

Freshwater Application Report

January 2007 through October 2007

10/2/2007    10:20:16AM

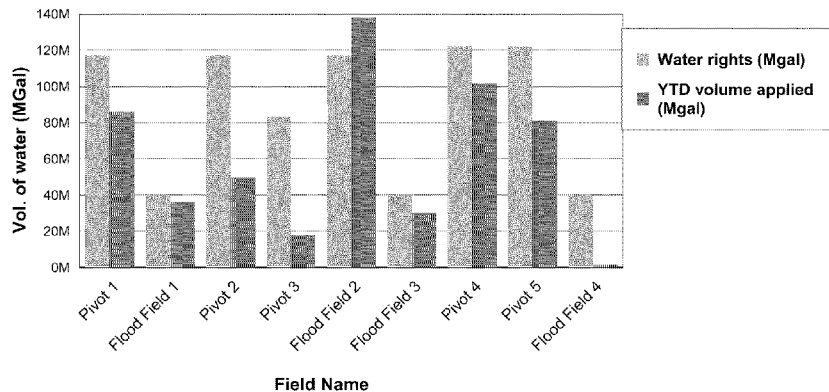

Field Name

| Field # | Field Name | Ac | Crop | water rights | # of Irrigations | YTD vol. applied | | N applied | Vol. remaining* |
|---|---|---|---|---|---|---|---|---|---|
| | | | | ac-ft | | gal | % | lbs/a | gal |
| 3 | Pivot 1 | 120 | pasture grass/rye | 360 | 8 | 85,975,500 | 73 | 5.98 | 31,330,860 |
| 4 | Flood Field 1 | 40 | pasture grass/rye | 120 | 5 | 36,213,000 | 93 | 7.56 | 2,889,120 |
| 5 | Pivot 2 | 120 | winter forage | 360 | 7 | 49,440,600 | 42 | 3.44 | 67,865,760 |
| 6 | Pivot 3 | 85 | winter forage | 255 | 6 | 17,772,900 | 21 | 1.74 | 65,319,105 |
| 12 | Flood Field 2 | 120 | pasture grass/rye | 360 | 9 | 137,835,000 | 118 | 9.59 | (20,528,640) |
| 15 | Flood Field 3 | 40 | alfalfa | 120 | 5 | 30,108,000 | 77 | 6.28 | 8,994,120 |
| 17 | Pivot 4 | 125 | pasture grass/rye | 375 | 13 | 101,460,000 | 83 | 6.77 | 20,734,125 |
| 18 | Pivot 5 | 125 | pasture grass/rye | 375 | 8 | 81,115,500 | 66 | 5.42 | 41,078,625 |
| 21 | Flood Field 4 | 40 | winter forage | 120 | 1 | 1,556,400 | 4 | 0.32 | 37,545,720 |
| Total | | 815 | | | 2,445 | 541,476,900 | | | 255,228,795 |

* Volume of irrigation water that can be applied for the remainder of the year

Caution:   >50   >75%   >100%  of irrigation water rights utilized

Example Dairy

Fig. 27

NUTRIENT APPLICATION FORECASTING SYSTEM
NAFS©

Freshwater Application Report
January 2007 through November 2007
12/1/2007    10:20:46AM Page 40/41

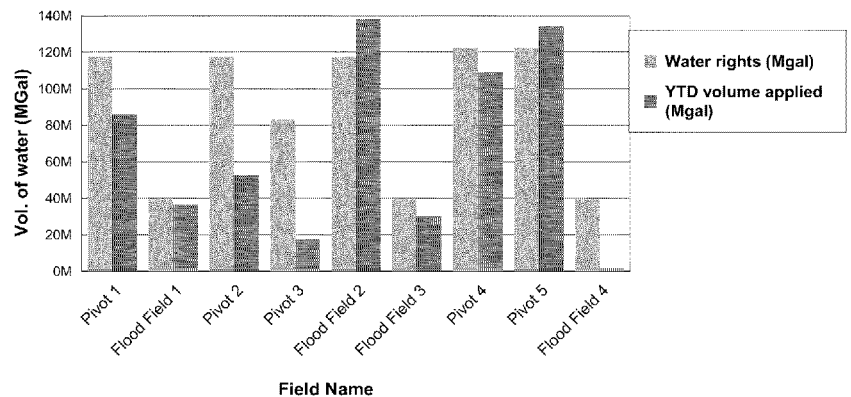

Field Name

| Field # | Field Name | Ac | Crop | # of water rights ac-ft | # of Irrigations | YTD vol. applied gal | % | N applied lbs/a | Vol. remaining* gal |
|---|---|---|---|---|---|---|---|---|---|
| 3 | Pivot 1 | 120 | pasture grass/rye | 360 | 6 | 85,975,500 | 73 | 5.98 | 31,330,860 |
| 4 | Flood Field 1 | 40 | pasture grass/rye | 120 | 5 | 36,213,000 | 93 | 7.56 | 2,889,120 |
| 5 | Pivot 2 | 120 | winter forage | 360 | 8 | 52,623,600 | 45 | 3.66 | 64,682,760 |
| 6 | Pivot 3 | 85 | winter forage | 255 | 6 | 17,772,900 | 21 | 1.74 | 65,319,105 |
| 12 | Flood Field 2 | 120 | pasture grass/rye | 360 | 9 | 137,835,000 | 118 | 9.59 | (20,528,640) |
| 15 | Flood Field 3 | 40 | alfalfa | 120 | 5 | 30,108,000 | 77 | 6.28 | 8,994,120 |
| 17 | Pivot 4 | 125 | pasture grass/rye | 375 | 14 | 108,942,000 | 89 | 7.27 | 13,252,125 |
| 18 | Pivot 5 | 125 | pasture grass/rye | 375 | 12 | 134,350,500 | 110 | 8.97 | (12,156,375) |
| 21 | Flood Field 4 | 40 | winter forage | 120 | 1 | 1,556,400 | 4 | 0.32 | 37,545,720 |
| Total | | 815 | | 2,445 | | 605,376,900 | | | 191,328,795 |

* Volume of irrigation water that can be applied for the remainder of the year

Caution:   >50   >75%   >100% of irrigation water rights utilized

Page 1 of 1

*Example Dairy*

Fig. 28

NUTRIENT APPLICATION FORECASTING SYSTEM
NAFS©

Freshwater Application Report
January 2007 through December 2007
1/1/2008    10:29:37AM

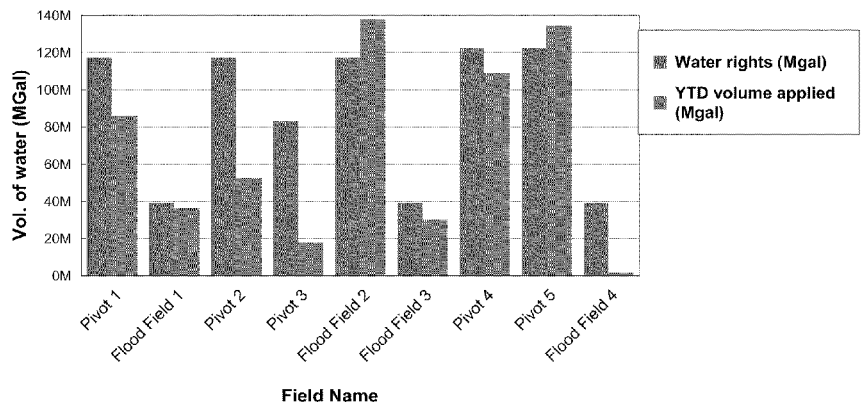

Field Name

| Field # | Field Name | Ac | Crop | water rights ac-ft | # of Irrigations | YTD vol. applied gal | % | N applied lbs/a | Vol. remaining* gal |
|---|---|---|---|---|---|---|---|---|---|
| 3 | Pivot 1 | 120 | pasture grass/rye | 360 | 6 | 85,975,500 | 73 | 5.98 | 31,330,860 |
| 4 | Flood Field 1 | 40 | pasture grass/rye | 120 | 5 | 36,213,000 | 93 | 7.56 | 2,889,120 |
| 5 | Pivot 2 | 120 | winter forage | 360 | 8 | 52,623,600 | 45 | 3.66 | 64,682,760 |
| 6 | Pivot 3 | 85 | winter forage | 255 | 6 | 17,772,900 | 21 | 1.74 | 65,319,105 |
| 12 | Flood Field 2 | 120 | pasture grass/rye | 360 | 9 | 137,835,000 | 118 | 9.59 | (20,528,640) |
| 15 | Flood Field 3 | 40 | alfalfa | 120 | 5 | 30,108,000 | 77 | 6.28 | 8,994,120 |
| 17 | Pivot 4 | 125 | pasture grass/rye | 375 | 14 | 108,942,000 | 89 | 7.27 | 13,252,125 |
| 18 | Pivot 5 | 125 | pasture grass/rye | 375 | 12 | 134,350,500 | 110 | 8.97 | (12,156,375) |
| 21 | Flood Field 4 | 40 | winter forage | 120 | 1 | 1,556,400 | 4 | 0.32 | 37,545,720 |
| Total | | 815 | | 2,445 | | 605,376,900 | | | 191,328,795 |

* Volume of irrigation water that can be applied for the remainder of the year

Caution:  >50   >75%   >100%  of irrigation water rights utilized

Page 1 of 1

NUTRIENT APPLICATION FORECASTING SYSTEM (NAFS) IN PARTICULAR FOR AFO/CAFO LIQUID MANURE APPLICATIONS

CROSS REFERENCE TO RELATED APPLICATIONS

This application claims priority to U.S. provisional Application Ser. No. 61/137,629 filed Aug. 1, 2008 entitled Nutrient Application Forecasting System, in particular for AFO/CAFO Liquid Manure Applications by inventors Jay Lazarus and Reddy R. Ganta the contents of which are herein incorporated by reference in their entirety.

FIELD OF THE INVENTION

The invention relates to methods, using a computer and software, for providing running real time forecasts of the status of, and limits for, nutrient applications to fields. The invention relates to in particular to AFO/CAFO [Animal Feeding Operations (AFO) and Concentrated Animal Feeding Operations (CAFO) (together referenced to as AFO/CAFOs)] manure applications from one or more sources to a plurality of fields in accordance with an agronomic standard. The typical agronomic standard dictates that the application of a targeted substance, such as nitrogen or phosphorous, to a field should not exceed the predicted crop uptake of that substance over an agronomic period, such as a calendar year.

BACKGROUND OF THE INVENTION

The instant invention relates in general to methods to improve Best Management Practices (sometimes referred to as BMPs) for land application of certain nutrients, especially manures, and in particular liquid manures, and most particularly, liquid manures generated from AFO/CAFO's. The instant method is sometimes referred to as a Nutrient Application Forecasting System.

The "real time" forecasting (referred to as "real time" to contrast with annual or semi annual reporting systems) utilizes estimates, predictions and approximations, as convenient and/or necessary, and typically incorporates historic data and updated data when possible. Although the forecasts are not exact, they can be expected to increase in accuracy as a period progresses, when more actual data are known, parameters are updated and the remainder of the period of forecast decreases.

In a preferred embodiment the instant invention provides running real time forecasts to AFO/CAFO operators of the capacity of various fields to further absorb certain nutrients based on an agronomic standard. The forecasts relate to the application of liquid and solid manures (manures) from one or more manure sources, such as dairy barn lagoons or lagoons at swine production facilities, which forecasting will assist the facility to remain in "regulatory compliance." The forecasts are related to one or more targeted or regulated substances, such as nitrogen or phosphorous.

The inventive system was developed to address significant problems in the operation of AFO/CAFO fields in the application of their manures. The system could, however, have application in analogous areas. Freshwater management forecasting and crop optimization practices are useful added features. Prediction algorithms can take into account a great number of factors, as appropriate to the circumstances, including weather and environmental events, as data is available. The program can be applied to golf courses that apply municipal waste water and/or sewage sludge. Automated controls could be added such that the program controlled an automated irrigation and valving control system and/or the program could obtain data from automatic data loggers.

A preferred embodiment of the instant Nutrient Applications Forecasting System (NAFS) preferably provides a running indicia of the status of a plurality of fields to further absorb at least one targeted substance, as a function of certain "nutrients" applied to the fields (e.g. liquid manure, solids, chemical fertilizers, etc,) and "taken up" from the fields via crops, vis-à-vis an agronomic standard (e.g. crop uptake of substance greater than or equal to application of substance.) The system preferably also adds a running real time forecast of freshwater usage vs. freshwater limitations (e.g. freshwater capacity and/or water rights.) Exceeding freshwater application limits in terms of water rights can result in regulatory non-compliance. Use of freshwater can be and frequently is closely related to use of lagoon water. A further natural use of a running real time forecast system lies in a complementary area of forecasting crop optimization parameters.

Preferred embodiments would further update an estimated targeted substance content of manure sources with new measured values at least once per crop season, preferably twice or four times per accounting period, or more, and as well would update the crop uptake estimate in regard to the targeted substance at least once during an agronomic period, (which is typically a calendar year.) At the end of a first crop season of the period, crop yield data permits making more accurate estimates of the actual crop uptake of targeted substance(s) for the full period.

Running real time forecasts are best provided to field operators at least monthly, preferably every 15 days or after every nutrient application, in order to provide timely guides for subsequent nutrient application decisions and for management of manure sources and fresh water resources.

Primary substances targeted today by regulators are nitrogen substances and/or phosphorous substances. Many states regulate the soil/water content of either nitrogen substances or phosphorous substances. The regulated substance chosen may vary from jurisdiction to jurisdiction as well as from time to time. The instant system could accommodate a plurality of regulated or targeted substances, if necessary.

A liquid manure source could be any source of liquid manure. In regard to AFO/CAFO's it is typically lagoon water that has been washed and drained from a barn or swine facility, sometimes called "greenwater." Municipal waste water and municipal sewage sludge could also be a liquid manure source. In an example herein, the liquid manure sources refer to the lagoon waters of an AFO/CAFO.

The invention has particular relevance to regulated AFO/CAFOs, where falling out of regulatory compliance can shut down operations. AFO/CAFOs generate manures predominantly in the form of lagoon waters, although also in the form of manure solids and composts. Disposing of their liquid manures in a cost effective manner is a serious issue for the AFO/CAFO's, environmentally and financially. There are a significantly greater variety of cost effective means to dispose of solid manures and composts than of liquid manures.

A cost effective and approved method for disposing of liquid manures by an AFO/CAFO is to apply them to fields, usually owned, leased, managed and/or controlled by the AFO/CAFO. Typically the fields grow crops, such as grass or feed, that are in turn utilized in the AFO/CAFO operation. A typical regulatory agronomic standard mandates that all targeted substances land-applied to a field over a period of time by manures and other nutrient sources be "taken up" by the crops, thus preventing soil pollution. The agronomic goal for each AFO/CAFO field is for at least the regulated substance "uptake" of the crop from the applied nutrients sources be roughly equivalent to, if not less than, the regulated substance supplied to the field by all of the nutrients applied, (as in the form of manure solids, liquid manures and any other chemical fertilizers.)

An AFO/CAFO, by regulatory permit and plan, is designed to manage sufficient fields such that the regulated substance generation, application and subsequent crop absorption is predicted to be at least balanced. In many jurisdictions the AFO/CAFO is required to have a permit for nutrient application via greenwater based on a proposed plan that indicates that the agronomic balance is met. In addition, periodic testing measures the targeted substance content of each manure source, as a check on the permitted plan. The total liquid discharge from the barns to the lagoons (or from the lagoon(s) to the fields) is limited by permit and tracked by metering. As an after-the-fact check on the permitted plan, periodic testing (annual, bi-annual) is performed on the soil, ground water and surface water itself, notwithstanding the permit and plan, to insure that the fields have remained within the regulatory limits with respect to targeted substances. Exceeding the regulatory limits, as determined by the tests, can result in losing the permit and/or incurring abatement or administrative orders. All are costly. It is important to avoid creating the situation that results in tests showing lack of compliance.

An AFO/CAFO also supplies freshwater (well and/or surface) to its fields for growing the crops and may be subject to freshwater rights limitations and freshwater capacity limitations. Running status forecasts of freshwater use vis-à-vis freshwater limitations are also preferably provided by the instant invention. Use of freshwater is related to the use of greenwater.

In the course of operation, the instant forecasting system is in position to also supply crop optimization parameters, which can further enhance general cost effectiveness and be environmentally beneficial.

The instant invention, in preferred embodiments, relates to methods to provide an at least monthly real time updated running forecast of indicia of limits per field for the application of manure from each manure source for the remainder of an agronomic period. The forecasts are affected by past application of nutrients and estimated or measured nutrient content of manure sources. Alternately or in addition the invention provides a running real time updated forecast of indicia of the current estimated status of targeted substance per field, vis-à-vis an agronomic targeted substance limit. Preferably crop uptake and manure composition is updated, at least once after the beginning of an agronomic period, which is usually a calendar year. Periodic supply of incremental nutrient additions data per field, plus updating changes in the crop status and/or manure content, help guide the running forecasts to become even more accurate as the agronomic period progresses. Subsequent incremental additions of nutrient can be effected with greater precision, reliability and confidence by the operator.

SUMMARY OF THE PROBLEM AND SOLUTION

In many jurisdictions, AFO/CAFOs are required to submit to and to secure from regulatory authorities an approved "plan." This plan allows them to apply manures to fields.

The agronomic standard typically governing plans is that total crop uptake of targeted substance(s) should be greater than or equal to the application of the substance(s) through the manures to the crops in the fields.

Notwithstanding the existence of the plan, and a permit system, the instant inventor's own field testing has shown a discouraging recurrence of hot fields and unacceptable levels of targeted substances leaching out of and/or running off the soil, potentially contaminating surface and subsurface water. The inventor's testing indicates, to a surprising degree, that the plan and permit system is not an adequate solution.

Applicant's example of the instant reporting system, below, is based on actual preserved AFO/CAFO data. The example clearly illustrates the problem, as well as the solution. A surprising discrepancy appears, between the presumption that an AFO/CAFO operator can and will "follow" their plan and the reality of daily AFO/CAFO decisions.

Applicant's invention, in response to the above discovered problem, is to provide repeated updated forecasts to and for operators, forecasting in "real time" with updated parameters where possible, field status and estimated limitations on lagoon discharge for the remainder of the period, based on the targeted substance(s). The invention is critical to address the issue of conforming daily operational reality to an AFO/CAFO plan and for modifying the plan prior to incurring regulatory non-compliance.

Applicant's invention thus addresses the inadequacy of the annual permit and plan system by providing operators with at least bimonthly (and preferably daily or bi-weekly) forecasts of the environmental status of their fields, and of the environmental limits on discharging from their lagoons, for their current agronomic period. The environmental status and limitations information is a function of the agronomic standard and the targeted substance(s) of the jurisdiction.

The reports are structured to facilitate daily operational decisions. Preferably, in preparing reports, the invention updates, as is practical and feasible: (1) crop uptake estimates and/or predictions, which can be a function of actual crop harvest and weather; (2) targeted substance content of manure sources, which can and should be tested frequently; (3) anticipated needs to distribute manure solids and/or liquid manure from lagoons during the current agronomic period, which signals a key pressure on operators that affects their decisions; and (4) soil test results that are also used to guide land application of manures on fields Such current field status summaries and forecasts of discharge limits for lagoons, available in real time, allow an AFO/CAFO operator to avoid unknowingly commencing a chain of actions that inevitably has violation as their outcome. Real time forecasts allow operators to anticipate problems destined to arise later in the agronomic period, while significant response time yet remains. Response time permits altering key factors, even a crop for a field. Given advanced warning, a variety of remedial efforts can be undertaken prior to reaching a point of no return.

Benefits of the invention are anticipated to include the prevention of pollution of groundwater, such as from leaching, and prevention of pollution of surface water, such as by run off from AFOs and/or CAFOs from uninformed management of the application of manures. Particularly the invention should improve methods for managing "greenwater," defined as liquid or semi-liquid manure and urine and other materials discharged from a milking parlor or swine production facility or other AFO/CAFO. Large dairy or swine operations in particular generate complex greenwater management issues.

Further benefits of the invention lie in improving methods for managing irrigation waters and the application of other fertilization. The invention is intended to permit a running assessment of whether AFO/CAFO generated liquid manures are being applied to land application fields at agronomic rates, based on a process of incremental application, updating and re-forecasting. An ultimate benefit of the invention is to permit easier compliance with appropriate regulatory standards and/or laws.

The methodology includes performing running real time forecasting, at least monthly and preferably every 15 days, and most preferably between each nutrient application, or daily or bi-weekly in particular for government regulated land application of CAFO and AFO-generated liquid manures containing targeted substances such as nitrogen or phosphorus. The method preferably also takes into account the application of chemical fertilizers, organic fertilizers and irrigation fresh water from ground water or surface water sources. More particularly, the methodology relates to a system that uses periodically updated data input and analysis to help ensure that AFO/CAFO generated nutrients, in particular manure solids and urine and liquid manure (effluent; greenwater; parlor wash water; wastewater; feedlot storm water; swine waste/effluent water; lagoon water; and all CAFO and AFO wastewater as defined by 40CFR Parts 9, 122, 123, 412 and all applicable State administered NPDES permits or equivalent or other environmental, agricultural or wastewater discharge permits) are applied to land application areas at agronomic rates, and that government permitted effluent/greenwater discharge volumes are not exceeded, that government permitted water rights are not over appropriated, and that soils are not overloaded with chemicals that lower crop yield and cause un-permitted (i.e. without permit) run off into surface water or leach down into ground water aquifers in concentrations that could exceed regulatory standards. Such is the goal of the periodic running real time forecasting report system based on incremental applications of nutrients and periodic updating.

The methodology teaches a periodic running real time forecasting of capacities for and limits for agronomic absorption of liquid manures and fertilizers, and preferably also limitations on applications of irrigation fresh water from ground water or surface water sources, to land application fields. The system allows an AFO/CAFO operator to be proactive in making decisions regarding incremental applications of liquid manures, (and chemical fertilizers, as well,) to land application areas, rather than waiting for the end of the crop harvest to measure (or test) whether the application of regulated manures and chemicals exceeded permitted volumes and/or concentrations.

In the prior art, at locations where over-application of CAFO and AFO generated greenwater and manures has caused exceedences (violations) of regulatory standards (concentrations, limits) for regulated chemicals in soils, crops, ground water or surface water, the regulated chemicals may have leached vertically below the effective plant rooting zone depth through the unsaturated (vadose) zone and/or into ground water or run off in a dissolved or soil-bound phased into surface waters. Sound agricultural farm management should manage AFO/CAFO generated manures using Best Management Practices (BMPs) to avoid such results.

Prior art BMPs do not incorporate a running real time forecasting system, including computer and software, allowing informed incremental additions of manures, following agronomic principles. At sites where prior art BMPs are followed, regulated chemicals, as a result, often leach into and through the soil and underlying geologic materials and into ground water aquifers, causing ground water pollution. Where such prior art BMPs for land application of regulated chemicals are followed, regulated chemicals have also run off into surface water bodies, causing contamination.

Prior art practices only measure past actual land application rates of nutrients or AFO/CAFO-generated manures after the fact, at regulatory prescribed time periods such as semi-annually or at the end of the year or cropping period, which is after significant amounts of regulated chemicals, permitted greenwater, manures and fresh water (irrigation water; ground or surface water) have already been land applied, and after significant numbers of the incremental management decisions have already been made. The instant inventive method, which may be referred to as Nutrient Application Forecasting System (NAFS,) is used as a real time proactive tool to agronomically manage the incremental applications of nutrients, fresh water and manure, to land application fields based on best current forecasts. Such is especially valuable where the diversion and beneficial use of surface and/or ground water, soil and ground water chemistry is also closely regulated by local, district, State or Federal regulatory water supply, environmental or agricultural agencies. One goal is to insure that regulated chemicals do not run off into surface waters or leach into ground water and aquifers. Prior art BMPs rely heavily on soil chemistry data collected after the crop is harvested. Use of the instant NAFS methodology is a superior and advanced BMP as it allows a running real time forecasting of capacities and limitations and coordinated incremental management of manures application, followed by updating the forecasts, prior to the stage of having over-applied manures and fresh water to land application fields.

In contrast to prior art BMPs and after-the-fact land application analyses, the instant inventive NAFS methodology, through a preferred integrated analysis of soil chemistry, greenwater chemistry, manures chemistry, greenwater volumes, well water or surface water chemistry (irrigation water chemistry,) well water production/application, surface water chemistry, surface water production/application and chemical fertilizer concentrations, crop tissue analysis, is not only able to beneficially forecast capacities and limitations for crop uptake of regulated chemicals at efficient and environmentally sound agronomic application rates, but can also assist an AFO/CAFO operator to stay in compliance with water supply, water quality/environmental, agricultural, and related regulations. The subject methodology provides the synergistic advantage of providing incremental real time technical forecasting information to guide incremental decisions in order to remain in regulatory compliance, as well as to maximize crop production and remain in compliance with environmental, water supply and other regulatory permits.

Some specific advantages of the instant inventive NAFS methodology are that it preferably uses updated data for providing the real time running forecasting of manure application and/or absorption capacities and application limitations, to guide current decisions on incremental manure applications and preferably also irrigation diversions (well pumping or surface water,) and preferably integrates water quality and water supply data and needs. Consequently, the AFO/CAFO operator can better plan irrigation cycles that alternate greenwater and fresh water, chose which fields to which to apply liquid manure or manures and analyze which fields should no longer receive manures during a specific irrigation cycle or season. The AFO/CAFO operator can use the NAFS to help stay in compliance with environmental, water supply and other regulatory permits.

A basic agronomic uptake standard, typically used to define targeted substance limits, specifies that targeted substances application be equal to or less than crop nutrient uptake of targeted substances. (The term equal should be understood as only relatively exact, as appropriate in the agricultural field.) This basic agronomic uptake standard applies to a field over an agronomic period of time, usually a calendar year. Potential agronomic rate sources include universities, Natural Resource Conservation Service (NRCS,) research or the like.

Examples of output indicia for a targeted substance status vis-à-vis an agronomic limit for a field include a percent or amount of a targeted substance applied to date vis-à-vis the limit of that which can be applied according to the agronomic standard for the period. Such indicia can be translated into the percent and/or amount of a manure solid or greenwater applied vis-à-vis the amount that still may be applied, per field in accordance with the agronomic uptake standard for the period. Indicia for future nutrient management of a field preferably take into account updated targeted substance chemical compositions of manure solids and/or lagoon water and/or greenwater, updated application history of manure solids and/or lagoon water, and updated crop yield and crop uptake, estimates. Fresh water application, commercial fertilizer appreciation and residual soil content of a targeted substance, can be taken into account.

Crop uptake refers to the targeted substances predicted to be absorbed by the crop on the field during the agronomic period. It is typical to input indicia of crop yield for a field in order to estimate crop uptake although it is possible to estimate crop yield and/or uptake from databases. Based on anticipated crop yield, anticipated crop uptake of the targeted substance can be estimated from databases and algorithms. Such estimates can also be directly input. Alternately, crop uptake could be entered as a variable, dependent on weather input or the like. A climate database can affect crop yield and might be used to update crop yield and/or to limit freshwater pumping. Preferably the instant system, in outputting at least one indicia useful for nutrient management for a field, takes into account applicable climate data. A climate database can reflect temperatures and/or rainfall for a field over a crop season and could be updated with input of actual temperatures and rainfall for a field over a crop season.

Typical input field parameters include, directly or indirectly, crop, field size and location.

Targeted substances typically are regulated chemicals. Primary targeted substances include nitrogen or phosphorous substances. A key manure and/or fertilizer parameter would include, directly or indirectly, a targeted substance content per unit weight or volume.

Manure and/or fertilizer and greenwater application history preferably includes, directly or indirectly, the amount of solid and/or liquid manure and/or or chemical fertilizers added, in particular to the extent they contain and/or produce a targeted substance. Application history includes an indicia of an amount of application and preferably the date of application.

In preferred embodiments the present invention is an improved agricultural Best Management Practice method for application of AFO/CAFO generated manures to land application areas. The embodiments of the invention provide AFOs/CAFOs with the ability to forecast the results of their application of AFO/CAFO generated manures and other chemical fertilizers and irrigation water to government regulated land application areas, in particular so as not to exceed regulatory limits and to follow basic agronomic standards. In preferred embodiments NAFS may utilize statistical database tools, software programs such as Excel, and databases such as SQL, Oracle or Access, as well as a variety of input data from wells, greenwater lagoons, manures, chemical fertilizers, soil chemistry analysis, crop yield computations and rainfall predictions and history, to name a few, to forecast application of manures at agronomic rates, based on sophisticated input.

For the purposes of this invention, AFO/CAFO generated manures can be classified as manure solids, composts and liquid manures, all likely containing certain regulated chemicals and/or targeted substances.

The impetus for the development of the instant method began when the instant inventors' analyses of several CAFO-land application fields and application histories showed manures being applied at volumes and concentrations that exceeded agronomic rates. A clear major concern to the instant inventors was that:

1. agricultural Best Management Practices (BMPs) for AFO/CAFO's were not being followed and BMP's were not based on real time data or forecasting;
2. AFO/CAFO's were applying manures at volumes and concentrations that exceeded agronomic rates, e.g. exceeded crop uptake of regulated chemicals;
3. AFO/CAFOs were applying irrigation water without regard to volume or concentration of regulated chemicals in the irrigation water;
4. the soils in the land application fields were becoming overloaded with regulated chemicals and manures and additional regulated chemicals and manures could not be land applied, reducing land application and manures disposal options to the AFO/CAFO operator; and
5. excess regulated manures and chemicals might run off into surface waters, causing pollution or leach, or might have already leached into underlying aquifers, polluting ground water and causing the AFO/CAFO to be out of compliance with government, agricultural and/or environmental permits.

To improve Best Management Practices and protect surface water and ground water quality, as well as soil chemical, physical, and biological quality, the instant inventors' efforts focused on the development of a real time system to better forecast the results of past applications of AFO/CAFO generated manures, and to guide correct application decisions. Embodiments of the invention provide a method to forecast the results of application rates of AFO/CAFO generated manures (nutrients) through an agronomic period sufficiently well to guide a series of manure applications throughout the time period. The present invention is particularly well suited for use by AFOs/CAFOs to prevent pollution of surface and ground water and to remain in compliance with governmental regulations for land application of AFO/CAFO generated manures and regulated chemicals in general, such as Nitrogen and its associated compounds, Phosphorus and associated compounds, and/or metals and metal compounds including but not limited to micronutrients and heavy metals such as Cadmium (Cd), Copper (Cu), Nickel (Ni), Manganese (Mn), Selenium (Se), and Zinc (Zn) species and/or compounds and chemical fertilizers.

A key benefit and goal of the method is remaining in compliance or coming back into compliance with governmental, agricultural, environmental and water rights related operational permits.

To practice the invention in a most preferred embodiment, the following information would be determined, as steps are taken, which information or steps can affect input into the real time system.

Re Fresh Water Limitations
(1) the water supply (water rights and well production; ground water and/or surface water irrigation) is quantified;
(2) the place of use and purpose of use and point of diversion of all irrigation water is known;
(3) the specific capacity of the well(s) is calculated;
(4) precipitation is measured and recorded;

(5) all ground and surface water diversions for irrigation water supply are known or metered and recorded on a schedule;
(6) irrigation water quality is analyzed;

Re Manure Application Limitations (7) the permitted discharge and the receiving volume of greenwater storage is quantified;
(8) the volume or weight of produced manure solids is quantified;
(9) the concentration of regulated or targeted chemicals in manure solids, greenwater, lagoon water and soils are quantified;

Re Facilities and Operation

(10) the number of acres in the runoff area from the production area are quantified and the storm water discharge is calculated;
(11) the volume of liquid manure and/or storm water that is stored in lined or unlined, above-grade or below-grade lagoons or retention structures, is quantified;
(12) the storm water that is collected in separate storm water lagoon(s) or combined greenwater/storm water lagoons is quantified;
(13) discharge or reuse of greenwater, or liquid manure to the land application field(s) is metered and recorded;
(14) the elemental and mineral concentration in the feed ration is known
(15) how regulated chemicals in greenwater, lagoon water and storm water can be treated physically, biologically, or mechanically to change their chemical, physical and biological composition is known;
(16) how concentrations of regulated chemicals and/or compounds in greenwater, lagoon water and storm water lagoons naturally change their chemical, physical and biological composition is known;
(17) the concentration of regulated chemicals in the greenwater, lagoon water, manures and storm water discharge is quantified;
(18) the irrigation methods (sprinkler, flood, drip) are determined;
(19) the irrigation schedule is set with accommodations for variance in precipitation and available surface water;
(20) the greenwater, and lagoon water supply for irrigation is scheduled;
(21) the land application area is quantified;
(22) the concentrations of regulated or targeted chemicals in the soil root zone are quantified;
(23) the concentrations of regulated or targeted chemicals in the soil below the root zone are quantified;
(24) the blending ratio of greenwater, manures, and chemical fertilizer is known;
(25) how decomposition of manure solids and greenwater or lagoon water occurs in the land application fields is known;
(26) how transformation of TKN into NO3 and other N compounds occurs in the atmosphere and soil is quantified;

Re Operation Procedure

(27) the cropping pattern is selected;
(28) the historical uptake or published or established values of regulated or targeted chemicals by the crop on each land application field is known; or is obtained by crop tissue analysis
(29) the concentrations of regulated or targeted chemicals in the ground water in the vicinity of the land application area are quantified or can be quantified; and
(30) the frequency of fresh and greenwater or lagoon water irrigations is known.

Some, or all, of the above factors are input into databases (such as Access or SQL or Oracle or any other databases or spreadsheets such as Excel) using custom front end programs or any other spreadsheet or database application program or calculation. Inputs revised based on scheduled output, land application of manures, blending ratios, irrigation frequency or other factors can be accepted.

The NAFS system takes input data such as described above, QA/QC's the input data, processes and analyzes the data by performing calculations, running inbuilt models, and generates reports such as nutrient application forecasting reports and water rights forecasting reports, at least on a monthly basis or on a reporting frequency set by the user for a given year. Preferably the report is run at least every 15 days and best, after each manure application or daily or biweekly.

One object of the invention is to provide a new and improved system for guiding and assessing in real time whether AFO/CAFO generated manures are being applied to land application fields at agronomic rates, by at least forecasting land application effects of AFO/CAFO generated manures and chemical fertilizers.

Another object of the invention is to insure AFOs/CAFOs are in compliance with all government permits using an approved NAFS methodology.

Another object of the invention is to establish an appropriate, site specific frequency of input data collection and output analysis.

Another objective of the invention is to forecast effects of blending ratios between greenwater, manures, irrigation water, and chemical fertilizers.

Another object of the invention is to provides advance warning to insure that regulated chemicals do not migrate below the root zone or run off into surface waters or contaminate ground waters or aquifers, as it is detected by required periodic soil and water testing.

Another object of the invention is to provide new and improved Best Management Practices (BMPs) for land application of AFO/CAFO generated manures and chemical fertilizers.

Another object of the invention is to forecast crop uptake of regulated chemicals based on a frequency of meter data collection; and to permit greenwater and water quality parameter application forecasting including volume, fields and crops.

Further objects of the invention include:
fresh water application forecasting;
water rights utilization forecasting;
crop uptake forecasting;
regulated chemicals application forecasting;
soil nutrient chemistry status forecasting;
manure solids application forecasting;
chemical fertilizer application forecasting;
surface water, rivers, lakes, playas, ephemeral and intermittent streams, and coastal waters quality protection; and
ground water quality forecasting and protection.

Nutrient Application Forecasting System (NAFS)

A. Inputs

In a most preferred embodiment the following data, related to each input component presented in FIG. 1, would be cured, collected, and input into NAFS, and updated as available.

1. Greenwater or Lagoon Water
    Discharge permit volume
    Lagoon size
    Greenwater or lagoon stormwater quality data
    Rate at which lagoon fills and has to be emptied
    Stormwater input into greenwater lagoon
    Stormwater applied to Land Application Areas (LAA)
    Greenwater application meter readings Blending ratio
Method of blending with fresh water
Volume applied
Method of application
Risk assessment (Potential for runoff)
Composition in terms of targeted or regulated chemicals
2. Groundwater
Permitted water rights
Water quality data
Well meter readings
Volume applied
Water level in wells
Well production volumes/limitations
Specific capacity measurements
Blending ratio (fresh water to green or lagoon water)
Groundwater flow direction
Depth to Groundwater
Precipitation
Vadose Zone Characterization
Number of production wells
Locations of wells
Water rights on all land application fields
Method of blending
3. Surface Water
Permitted water rights and yearly availability
Water quality data
Volume applied
Blending ratio
Method of blending
Precipitation
Water rights on all land application fields
4. Manure Solids/Compost
Number of animal units
Solid manure produced on the facility per year
Solid manure chemical analysis data
Frequency of solid manure sampling
Solid manure application timing
Method of solid manure application
Risk assessment (Potential for runoff)
Carbon Sources
5. Chemical Fertilizers
Trade name
Chemical Name
Chemical Composition
Application timing
Amount applied
Method of application
6. Crop Uptake
Cropping pattern
Average yield/published yield
Yield reduction factors (diseases, pests, climate)
Crop rooting depth
Recommended N application rate
Recommended P application rate
Number of irrigations required
Irrigation method
Crop consumptive use
Averaged uptake/published uptake
7. Soils
Soil chemical and physical analysis data
P Index
Soil texture
Soil structure
Map unit
Soil limitations for crop irrigation
Leaching Index
8. Climate
Nearest climate station(s)
Precipitation
Temperature
Wind direction
Wind speed
Historic precipitation data
Historic snowfall data
Historic temperature data All the above input data would be "cured" prior to input into NAFS database. The data would be analyzed utilizing NAFS inbuilt models, calculations and projections.

Outputs

In a most preferred embodiment NAFS would output nutrient application forecasting reports on a continuous or regularly scheduled basis. These reports would be guiding tools for the producer/farmer to help in scheduling applications per crop needs while minimizing the potential for groundwater contamination and unpermitted surface water runoff. The following are preferred components of NAFS output reports.
1. Greenwater application planning and/or forecasting
2. Freshwater Application planning and/or forecasting
3. Manure solids Application planning and/or forecasting
4. Water rights utilization planning and forecasting
5. Crop uptake planning and forecasting
6. Soils nutrient status Planning and forecasting
7. Groundwater Quality Planning and Forecasting
8. Risk planning and forecasting (Potential for nutrient runoff forecasting)

SUMMARY OF THE INVENTION

The invention includes a method, utilizing a computer and software, for providing periodic forecasts within an agronomic period of the status of and/or the limits for nutrient application, preferably liquid manure application, to a plurality of fields according to at least one agronomic standard. The forecasts are based on at least one targeted substance. The method includes inputting directly or indirectly, for the agronomic period, parameters adequate to predict a targeted substance uptake for each of the fields, a content of the targeted substance in at least one manure source, and preferably in each of a plurality of manure sources, over time, and an application history of manure from the sources to the fields. The manure preferably includes liquid manure. The method includes outputting, as a function of the input, periodic indicia of the status of each field with respect to the targeted substance applied, as a function of anticipated and/or actual uptake, and/or outputting an indicia of an agronomic limit for future manure application to each field in an agronomic period based on the targeted substance and an agronomic standard.

BRIEF DESCRIPTION OF THE DRAWINGS

A better understanding of the present invention can be obtained when the following detailed description of the preferred embodiments are considered in conjunction with the following drawings, in which:

FIG. 1 is a schematic representation of the Nutrient Application Forecasting System (NAFS) of a preferred embodiment indicating potential and/or preferred inputs to the system and potential and/or preferred outputs from the system.

FIG. 2 is a schematic representation of a NAFS water rights module indicating potential and/or preferred inputs into the system and potential and/or preferred outputs from the system.

FIGS. 3-15 represent sample NAFS forecast reports for a dairy, covering the beginning of period (calendar year) and the months of January-December, based on historic data.

FIGS. 16-28 represent sample analogous NAFS freshwater application reports.

Figure 4A:
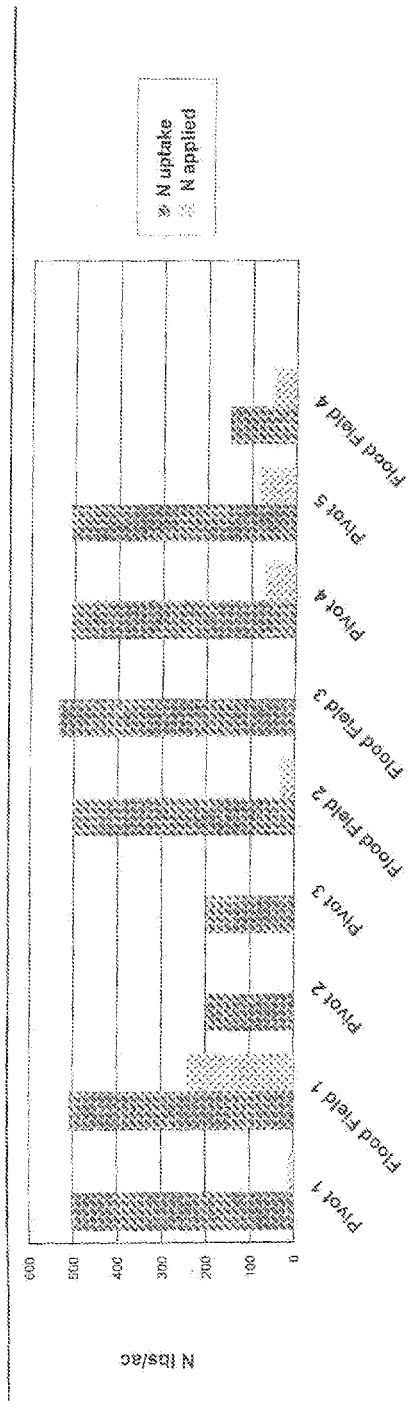

The drawings are primarily illustrative. It would be understood that structure may have been simplified and details omitted in order to convey certain aspects of the invention. Scale may be sacrificed to clarity.

DETAILED DESCRIPTION OF THE PREFERRED EMBODIMENTS

Operators of regulated AFO/CAFO land application fields are in some instances required to report the history of applied nutrients (manures) from their operations containing targeted substances to regulatory authorities semi-annually or annually. Dairies and swine facilities in particular are likely to be required to report their application of liquid manures, as well as chemical fertilizers, solid manures and composts, semi-annually or annually, as the manures contain targeted substances. Two targeted substances primarily regulated by states and/or federal agencies at present are either nitrogen substances or phosphorous substances. It could be both. Usually one or the other substance is regulated today. The operators report the application amounts of manures to the fields together with the measured manure content of the targeted substance, as per periodic measurements. An estimate of the targeted substance applied to date, and the targeted substance limit for the period may to be reported annually or semi annually to the appropriate regulating body.

In current practice, running real-time reports are not supplied to field operators, nor are they produced with a frequency or with a content applicable to guide decisions as to the capacity of each field to receive manure for the reminder of the reporting period. Operators are furnished no running real time forecast of the viability of their "permit" and "plan," or a real time comparison of plan vs. reality. Real time forecasts of the capacity of a field to receive manure from given sources for the remaining of an agronomic reporting period is preferably a function of an updated estimated content of targeted substance in the manure sources and of the history of other fertilization applied to the fields. Preferred real time reports would use reasonably updated estimates of the targeted substance content in each manure source and reasonably updated crop uptake data. Soil status as of the end of the last crop growing season is preferably also reported and taken into account.

In current practice, field operators on the spot determine the fields to receive waste water or liquid manures or manure solids or composts or chemical fertilizers, based upon a visual survey of the fields and pressured by a "need" to release liquid manure from the lagoons and to spread solid manures. Crop growth status, weather and convenience all affect the decision. Not until after the compiling of the semi-annual or end of year report is the cumulative effect of the operator's daily decisions appreciated. These decisions frequently, unknowingly and unintentionally, violate agronomic standards. Fields may be already out of permit compliance. Soil testing may already show violations. Water rights may already have been exceeded. A point of no return has been passed.

Factors affecting the agronomic limit for applying a targeted substance include the operator's crop choice and the projected yield. Substance uptake, however, is not only a function of the crop and the yield but is also affected by actual weather and environmental events. An initial uptake estimate might be set by published data or by a figure supplied by the regulatory authorities. Actual Weather data can be used to modify initial estimates. Also, after a first crop of an agronomic period is harvested, even more accurate uptake figures are available.

As discussed above, the primary agronomic standard dictates that crop uptake of a targeted substance be equal to (or less than) the total application of the targeted substance during the regulatory time period. Given a limit so established for a targeted substance for a field based on projected crop uptake, the instant invention preferably updates parameters when possible to produce real time more accurate forecasts of status and limits, preferably at least monthly, better every 15 days and best at least after every manure application. The invention forecasts the amount applied to date of the targeted substance to each field as a result of the nutrient application history, utilizing updated parameters as available, including those related to manure nutrient composition. The report preferably forecasts a limit for further nutrient application from each of a variety of manure sources for a plurality of fields for the remainder of the period, again taking into account any updated crop yield, updated uptake and updated manure content parameters.

The report preferably includes a forecast of the maximum amount of manure that can be applied to a field from a given manure source, for the rest of the period, in accordance with a standard. Such a running forecast is preferably provided for each manure source, as in an operation such as an AFO/CAFO dairy, there may be a plurality of liquid manure sources or lagoons. Examples of running forecasts of current status vs manure limit can be presented visually by graphs or charts and/or in percent figures and numbers.

In the instant invention the content of targeted substance in a manure source is preferably updated at least quarterly. The updated values are formulaically applied in accordance with the local regulatory system for taking such updated values into account. For instance, in accordance with the regulatory prescribed process in a jurisdiction, the updated value may be taken into account by the system by being averaged over the time period, or may be accepted as the true value for the next period until a further new sample result is produced.

Regulated fields have soils sampled periodically, such as yearly or once every three to five years. The instant invention also preferably takes into account the results of prior soil samples, at least by reporting them. An excess of a targeted substance in the soil of a field at the end of a period could be taken into account in the succeeding period by reducing the agronomic limit for that field, or by a subtraction from projected crop uptake for that field for the next time period, or by a warning advising no application of manures containing that substance to the field for the next crop season. A potentially excessive level of a targeted substance in a field can be operationally addressed by strategies such as changing crops and operating the field with fresh water and selected chemical fertilizers for a season.

The instant invention helps an operator remain within agronomic limits while optimizing the nutrient application process. As the operator makes incremental decisions throughout the period affecting the application of manure, the running real time forecast, based on updated estimates and reflecting lagoon discharge needs, guides the operator to take into account which fields can best absorb the manures in order for all fields to remains in compliance while the lagoon water is disposed of. Original estimates for a fields' capacity to absorb manure can be refined based upon a variety of factors. To the extent that the operator is guided by a currently updated forecast, the ultimate outcome at the end of a period can be optimized. The capacity for planning at each application should curtail wide divergences from developing early, as early errors of judgment can become impossible to correct later. (E.g. not withstanding that a field has absorbed its agronomic limit of a targeted substance, liquid manures may still need to be applied because of their capacity to deliver other nutrients, including of course water, in order to sustain the crop. Also lagoon capacity limits may have to be accommodated, and that can be affected by weather, such as rainfall.)

FIG. 1 schematically indicates an overview of the instant Nutrient Application Forecasting System. Potential inputs are indicated generically as well as potential outputs of the system. FIG. 2 indicates a similar schematic representation of the Nutrient Application Forecasting System applied to water rights. Again inputs are indicated generically, as are outputs.

Figure 14A:
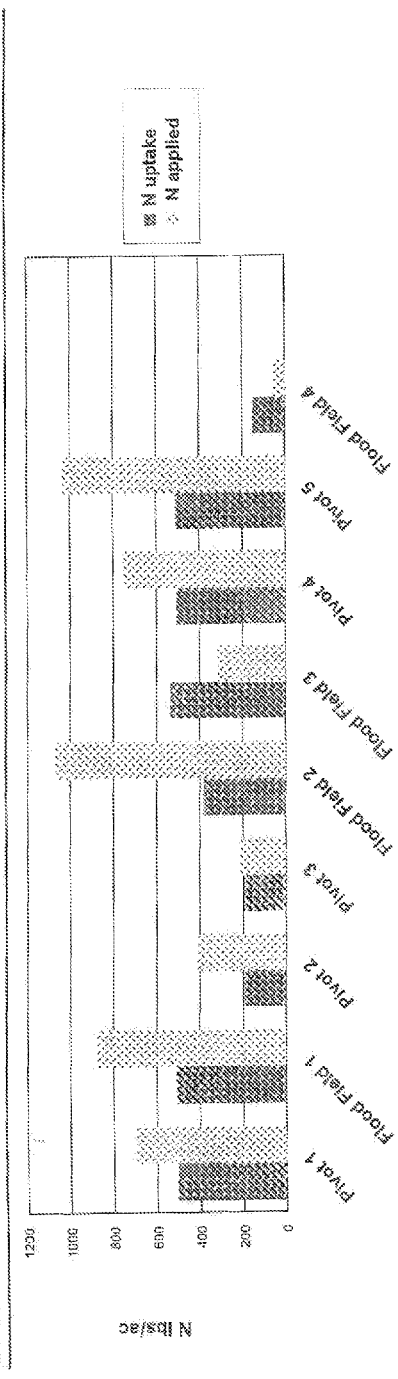
Figure 15A:
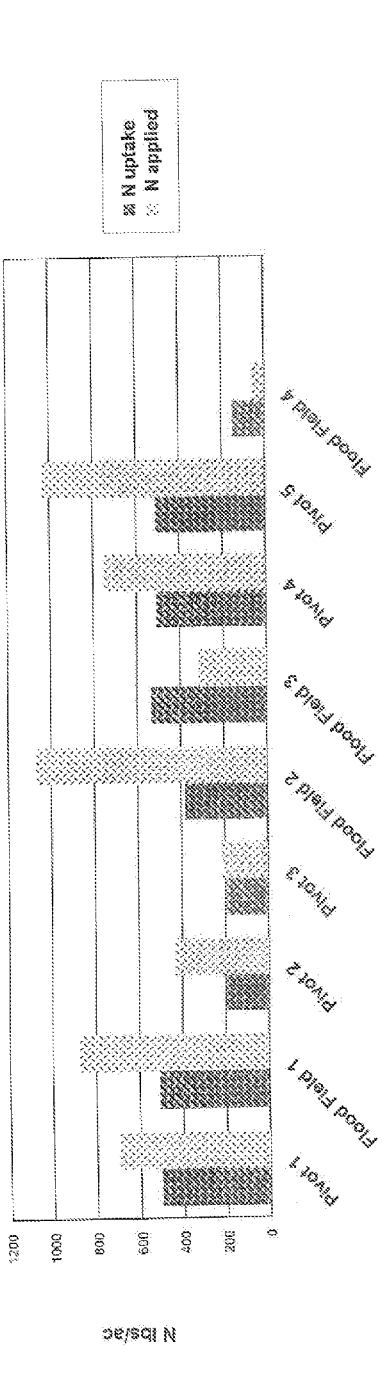

FIGS. 13-30 indicate hypothetical sample outputs for a preferred embodiment of the instant invention. Note: the input figures were roughly based upon an actual history from an operation of a dairy, a dairy that did not have the benefit of the instant invention. The value of the invention becomes strikingly illustrated in this example. Although the dairy stayed "within permit" for the year, 7 out of 9 fields violated the agronomic standard, some by over two-fold. Review of the beginning of the year forecast alone foreshadows an ultimate serious lack of compliance destined to result from the year's operation, without operational changes, notwithstanding remaining within "permit limits." Remaining within "permit limits" does not save an operation from severe penalties when soil or water test out of compliance. E.g. in the sample case a warning should have been heeded initially in regard to further applying greenwater to some fields for the rest of the year. The initial January forecast indicated incompatible planning. Availability of the forecast could have permitted alerting operations while there was time to make effective corrections and remain in compliance.

The sample set of forecasts of FIGS. 13-30 reflects reality all too frequently in the inventor's experience, as operators do not have the benefit of the instant invention. The hypothetical operator of the fields for the year did not have the advantage of the instant forecasting and did indeed apply greenwater to fields that already had a very high level of nitrate, as well as high levels of already applied greenwater. As review of the bar graph on FIG. 16A, the report for the end of the year 2007 indicates that seven out of nine fields are out of compliance. Two fields appear to have nitrogen applied from greenwater at almost twice the level of nitrogen uptake for the field.

Explanation of the Sample Forecast

In the sample outputs the agronomic period is the calendar year of 2007. The thirteen sample forecasts are for the beginning of the year and for the end of each month. Preferably forecasts would issue more frequently, e.g. bimonthly or weekly or after each application of nutrients.

In the example, nutrients come from three separate lagoons, each fed by one of three barns, were applied to nine fields. The regulated targeted substance is nitrogen. (Note: multiple barns and/or lagoons can funnel in practice into one lagoon for discharge purposes. NAFS can accommodate that.)

In the example each field is given a name, a number, its acreage and its crops for the agronomic period (the calendar year 2007.) The projected total crop uptake for the year of the targeted substance (in this case nitrogen) is computed and reported. This figure is based upon the crop, the estimated crop yield and the estimated crop uptake of targeted substance, based again on historic data or published data of the facility, as well as the total acreage of the field. In the example this total crop uptake figure is updated once for field 12 in August, to account for hail storm crop damage. In practice it should be updated as frequently as possible, including based on the actual harvest of the first crop, weather and any other factors or change.

As useful background information, the existing most recent measured nitrate content of the soil in each field is given, and a warning based thereon for some fields is reported. A footnote indicates whether the number, in parts per million, should be considered very low, low, moderate, high or very high.

A next column indicates the year to date volume of greenwater applied to each field from all sources. In the instant example there are three sources of liquid nutrients; that is, liquid manure comes from three different lagoons, fed by three barns, barn 1, barn 2 and barn 3. The next column indicates the year to date nitrogen applied, from the liquid manures from the lagoons of barns 1 and barn 2 and 3, from manure solids and from other fertilizers, as well as the total. It is instructive to compare this year to date total nitrogen applied with total crop uptake projected for the year. A subsequent column gives the year to date nitrogen applied as a percent of the projected crop uptake for the field.

A next column indicates the year to date phosphorous applied, in case the number is important. In some jurisdictions phosphorous is a targeted substance. It may be important or interesting to monitor phosphorous even if nitrogen is the targeted substance.

The last three columns indicate the volume of liquid manure or greenwater that can be applied, in million of gallons, from each barn's lagoon alone, exclusively to the field, without exceeding the agronomic limit for the remaining agronomic period. That is, in the year 2007, as of the beginning of the year field 3 could absorb approximately 52 million gallons of barn 3 lagoon water, or approximately 23 million gallons of barn 2 lagoon water, or approximately 16 million gallons of barn 1 lagoon water, and stay within the agronomic limit for the year.

Preferred embodiments of the invention highlight portions of the year to date nitrogen applied, as a percent of projected uptake, and when the percent exceeds 50%, when the percent exceeds 75% and when the percent exceeds 100%. The last row of the forecast, second page, indicates the total acreage of the fields and the total year to date volume applied and volume that can be applied to all fields from any barn/lagoon, exclusively.

To discuss the sample greenwater application forecast in more detail, nitrogen based, FIGS. 3A and 3B, the beginning of the year forecast, will be reviewed in more detail. FIG. 3B is a continuation of FIG. 3A.

The first four field columns primarily offer background identification information, namely the field number, the field name, the number of acres and the crop(s) for the agronomic period, which is assumed to be a calendar year in the example. Given historic estimates of the crop uptake of the targeted nitrogen per acre, the crop uptake for the field, the fifth column can be calculated. In the instant example the crop uptake calculation is updated only once for the calendar year, as an illustration. It could be and preferably is updated more frequently, especially at the end of a first crop season when the actual crop yield per acre should be known and a more accurate estimate as to crop uptake per acre or bushel or ton should be known. The sixth column indicates the soil test for or nitrate. This sixth column is also preferably color coded to indicate low levels, moderate levels, high levels and very high levels. A warning is added to the report advising the operator not to apply greenwater or lagoon water on fields with soil with very high measured nitrate.

The year to date volume applied is a metered volume measured from the lagoons to the fields. Permits are usually based upon metering wash water from the barns to the lagoons. A certain amount of evaporation and other losses occur due to volatilization of contents of the lagoon prior to application to the field. NAFS, when and as necessary, can take into account the anticipated daily evaporation and/or other losses of lagoon liquid. The fifth column indicates the percent of the projected crop uptake of the targeted substance, nitrogen, that already to date has been applied through the nutrient applications. The sixth, seventh and eighth columns indicates the volume of greenwater that can be applied, from each lagoon regarded as a sole source, to each field for the remainder of the calendar year, so that the field remains in compliance.

Figure 4B:
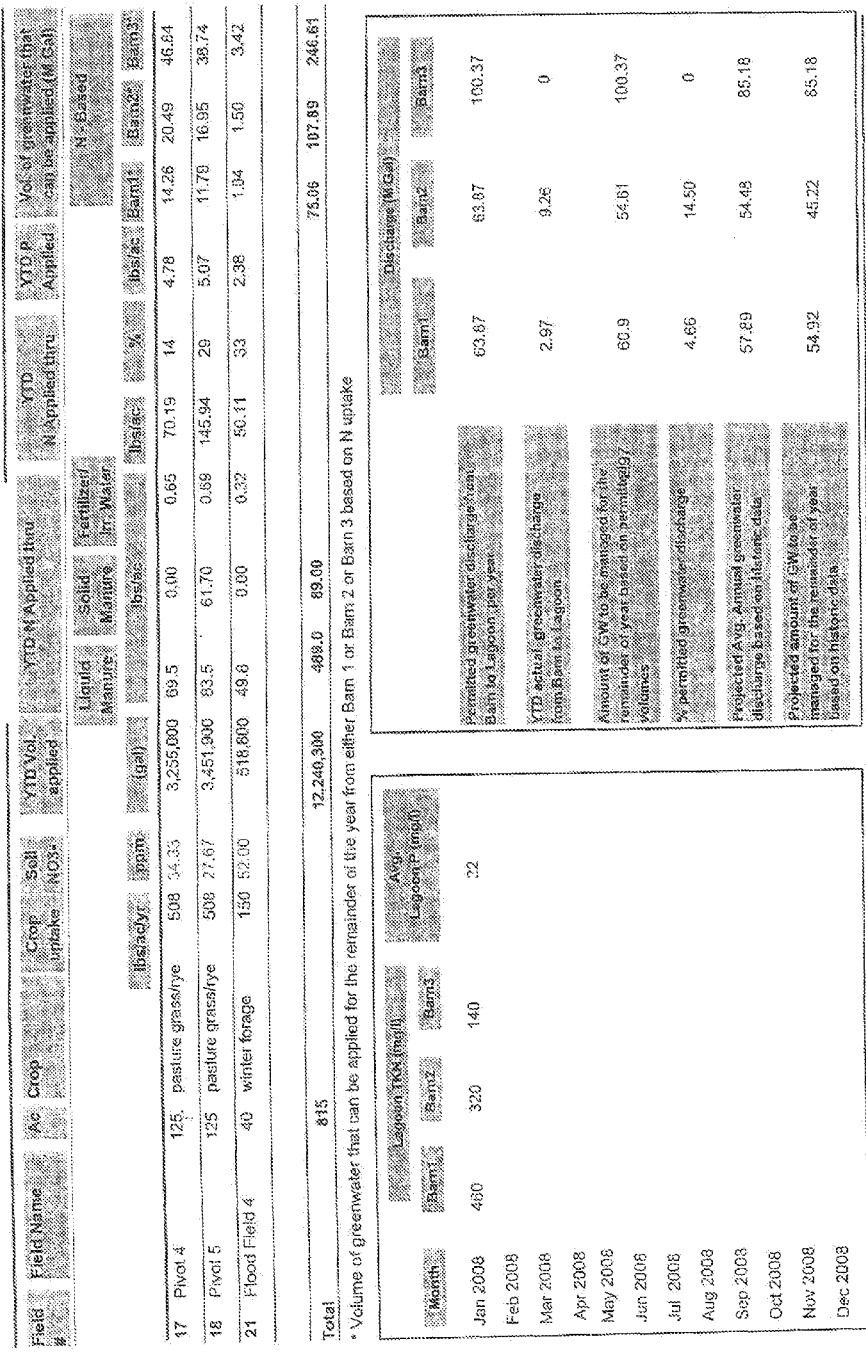
Figure 5B:
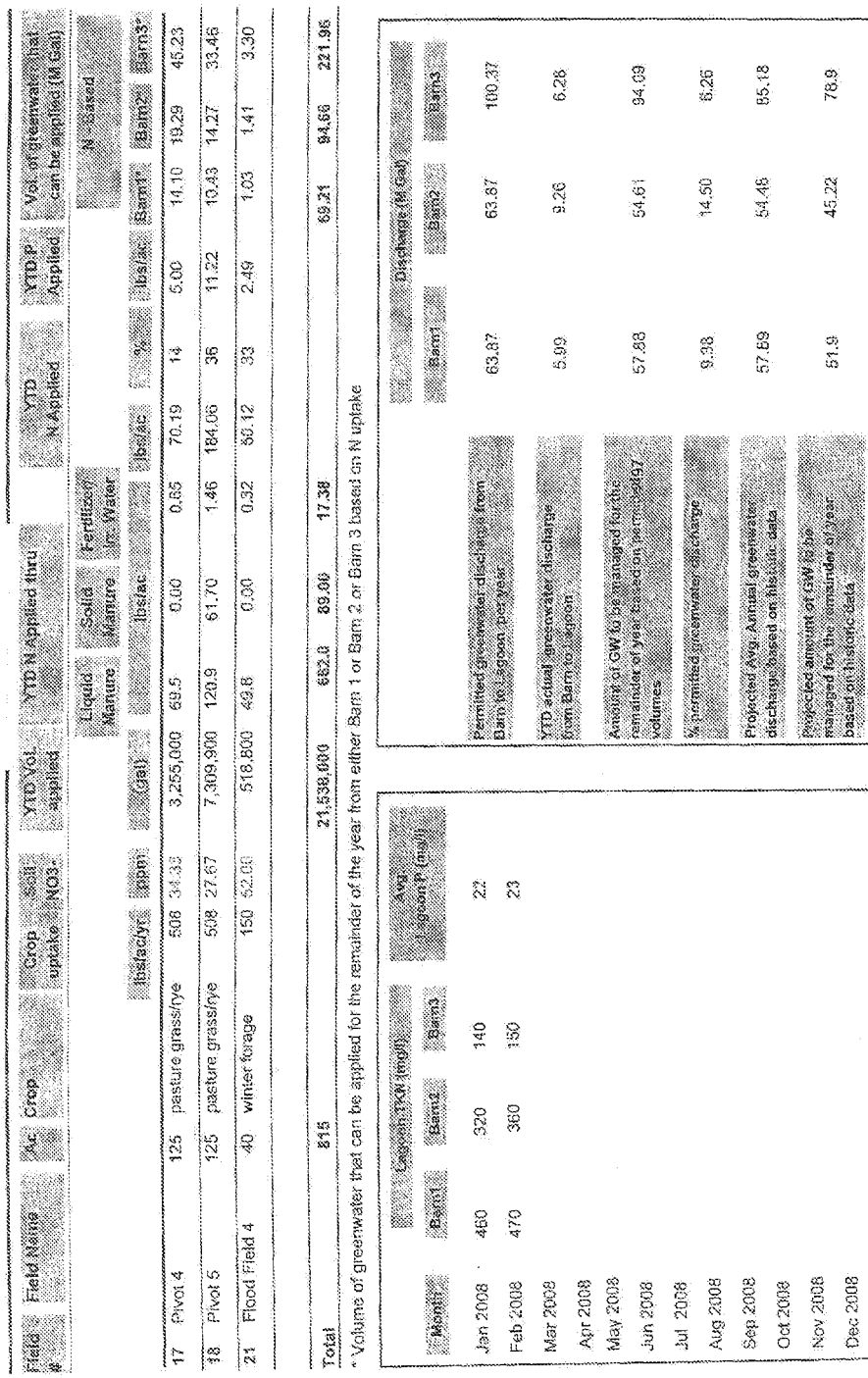
Figure 6A:
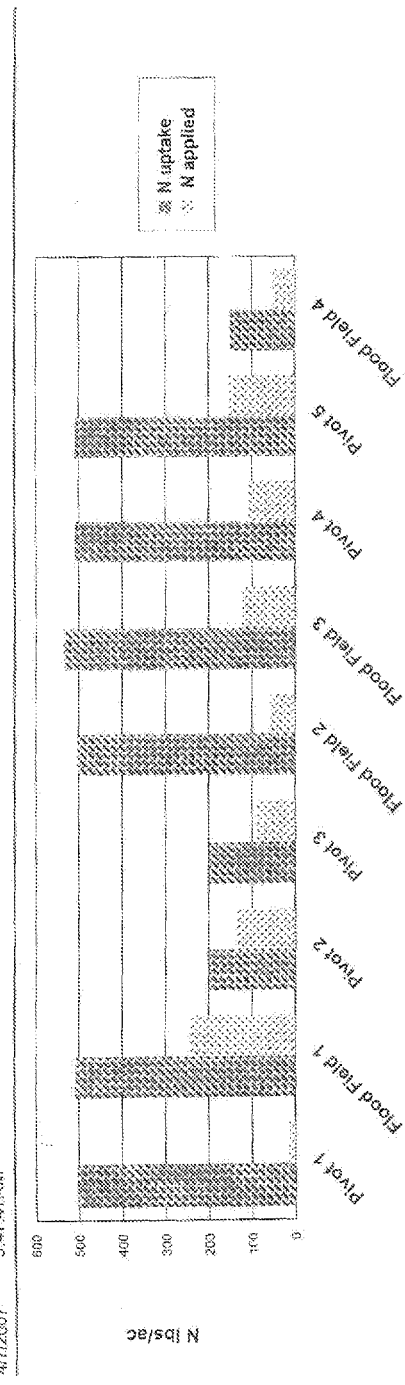
Figure 7A:
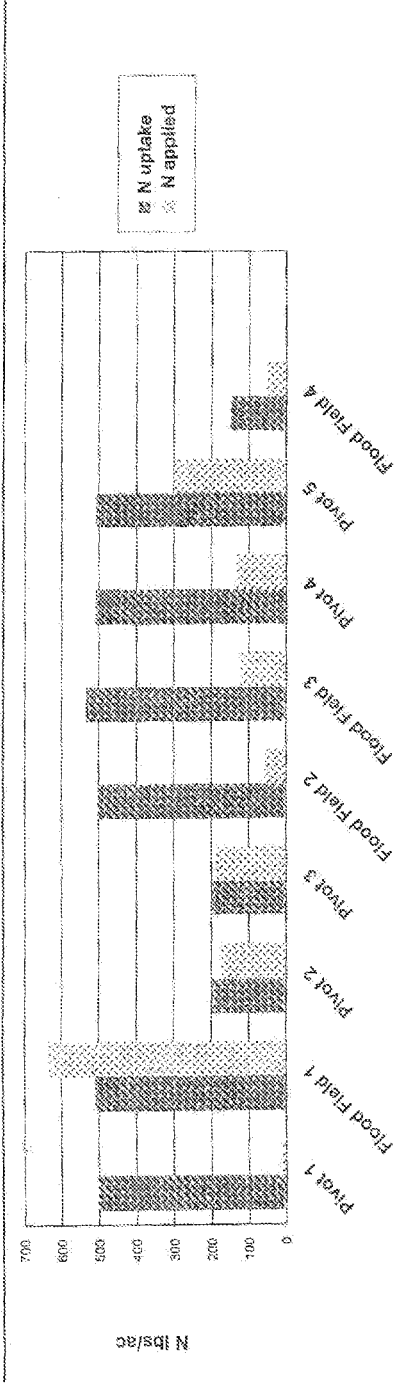
Figure 7B:
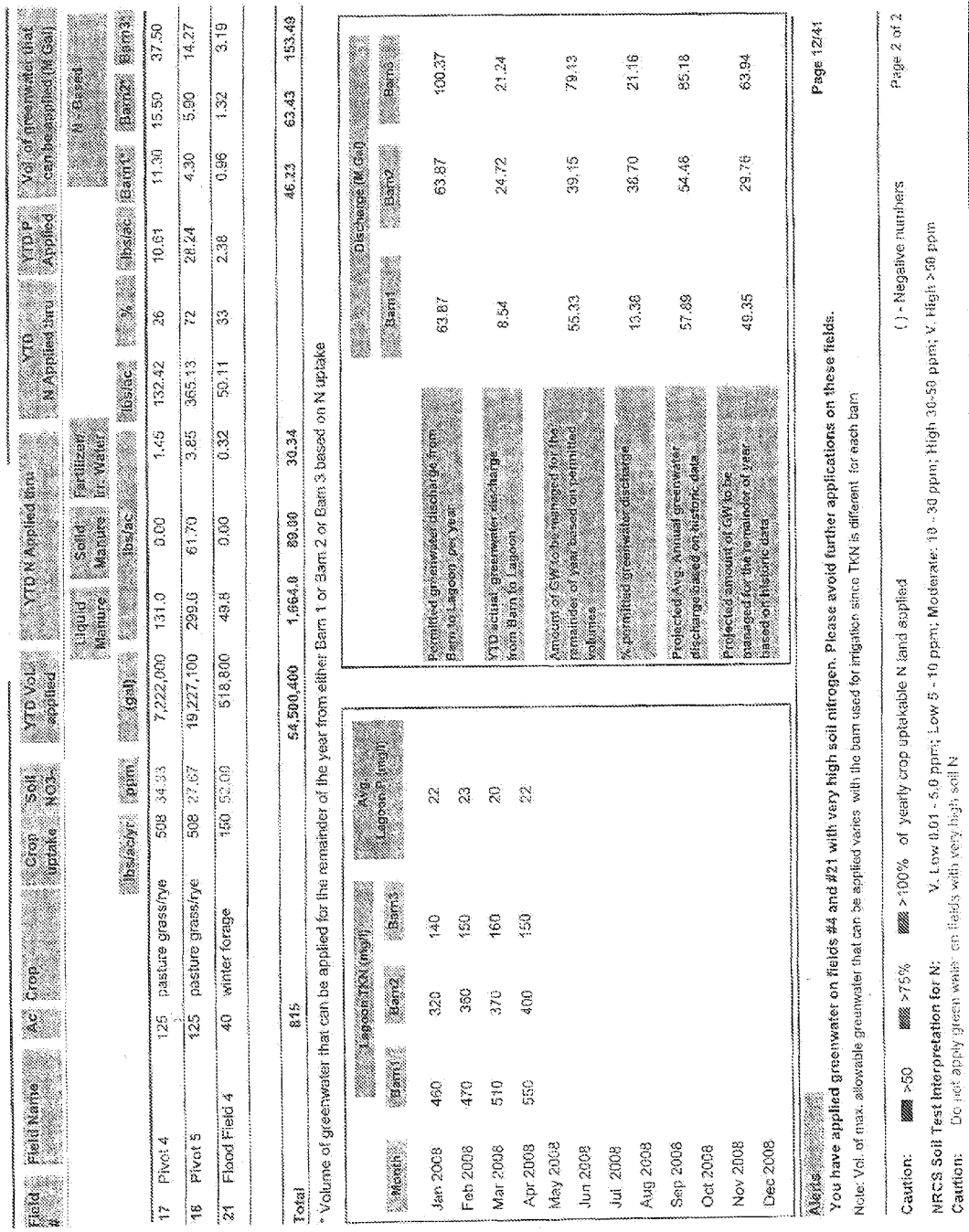
Figure 8A:
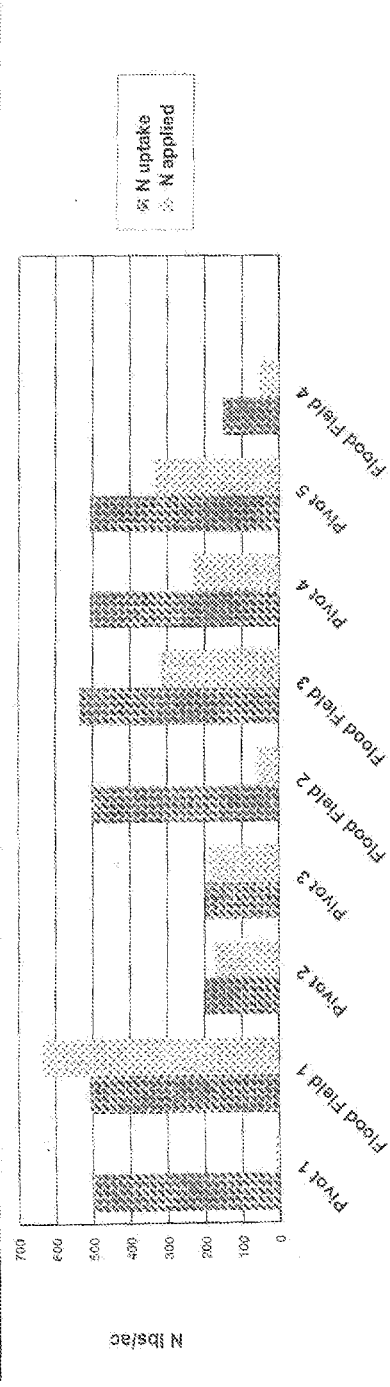
Figure 8B:
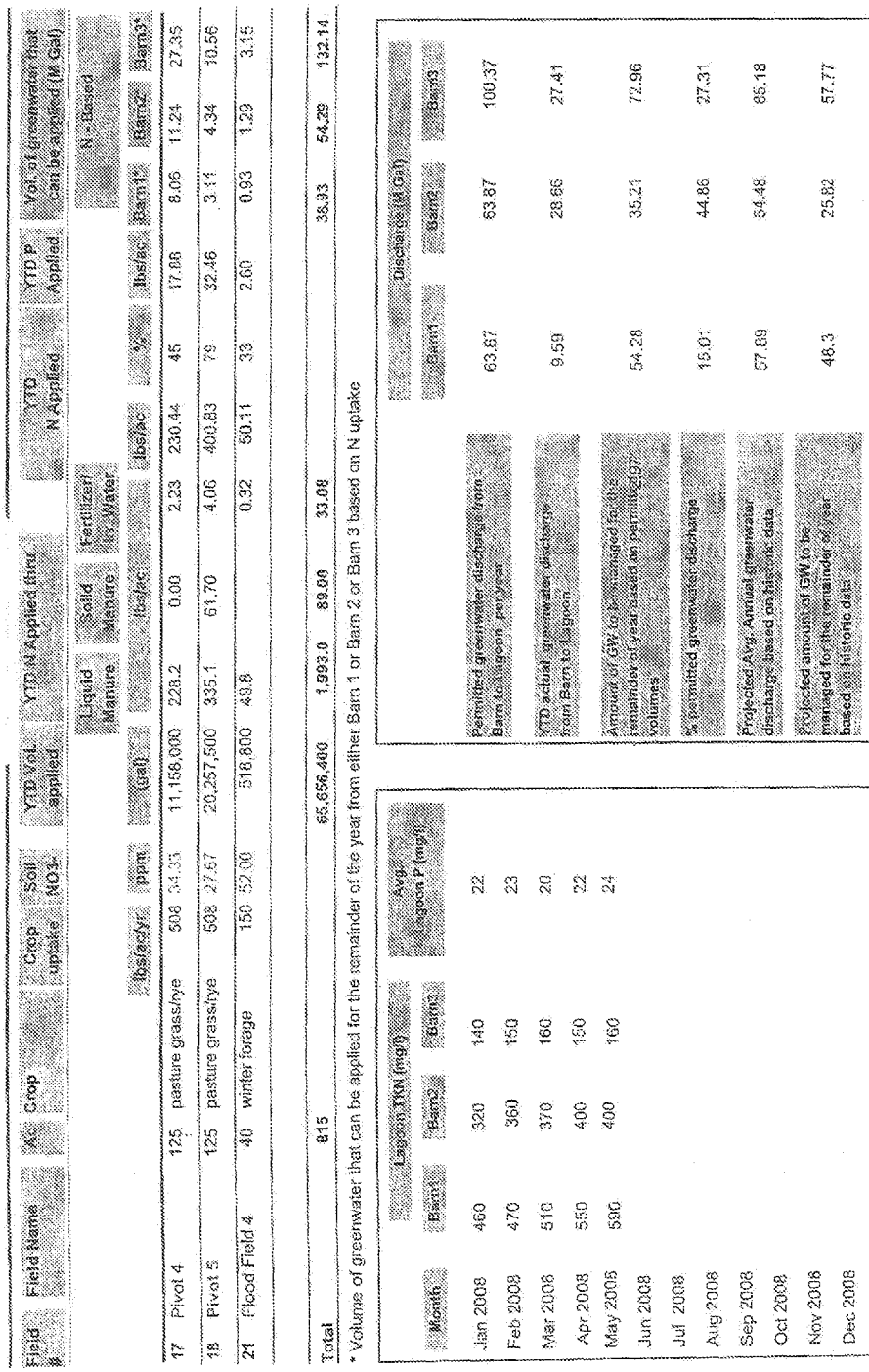
Figure 10B:
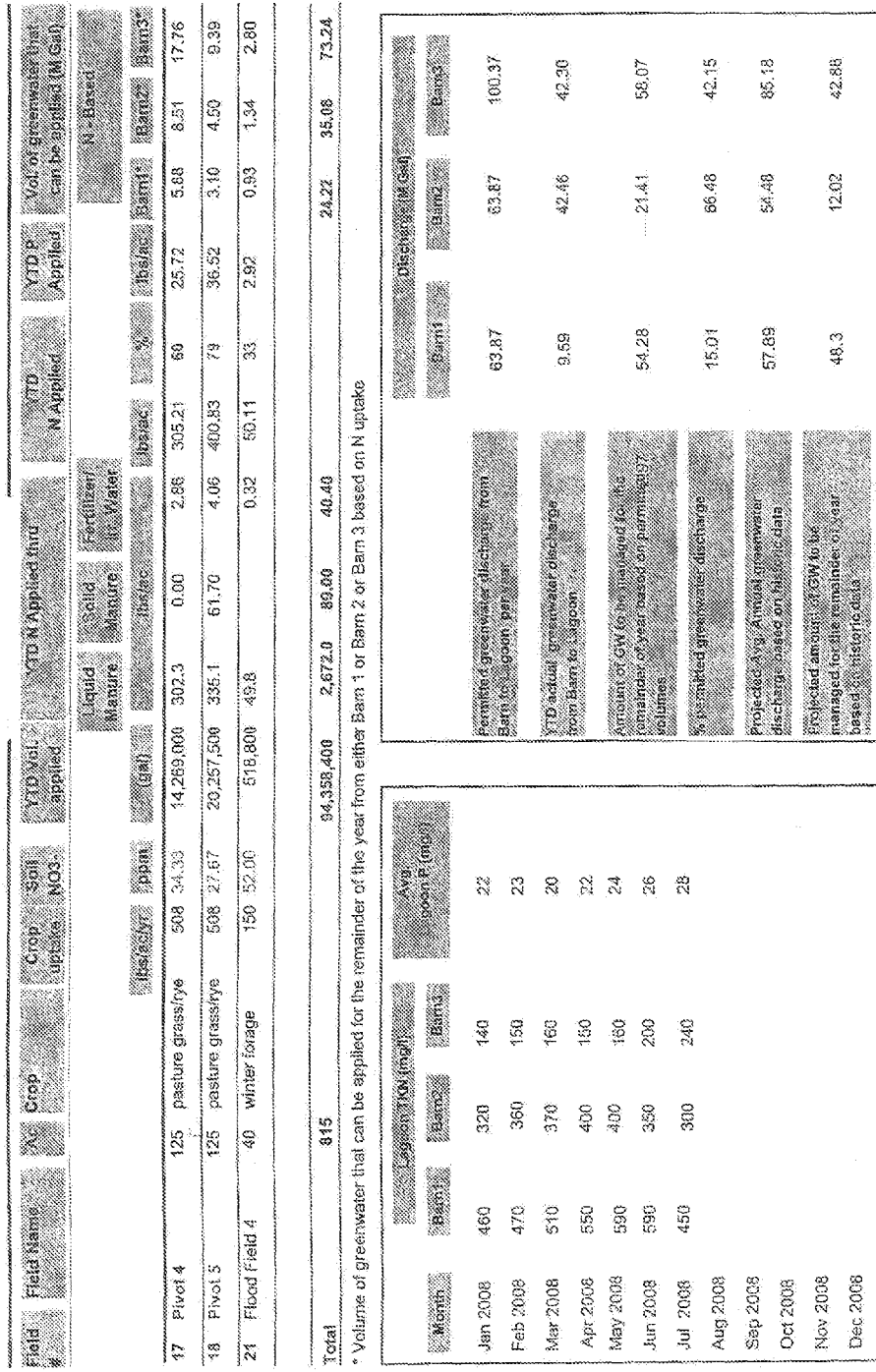
Figure 12A:
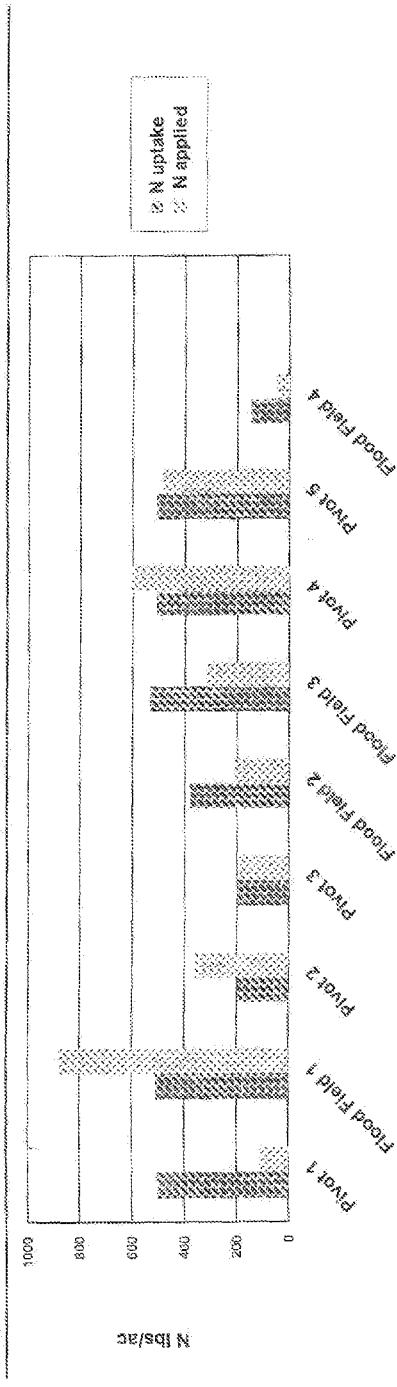
Figure 12B:
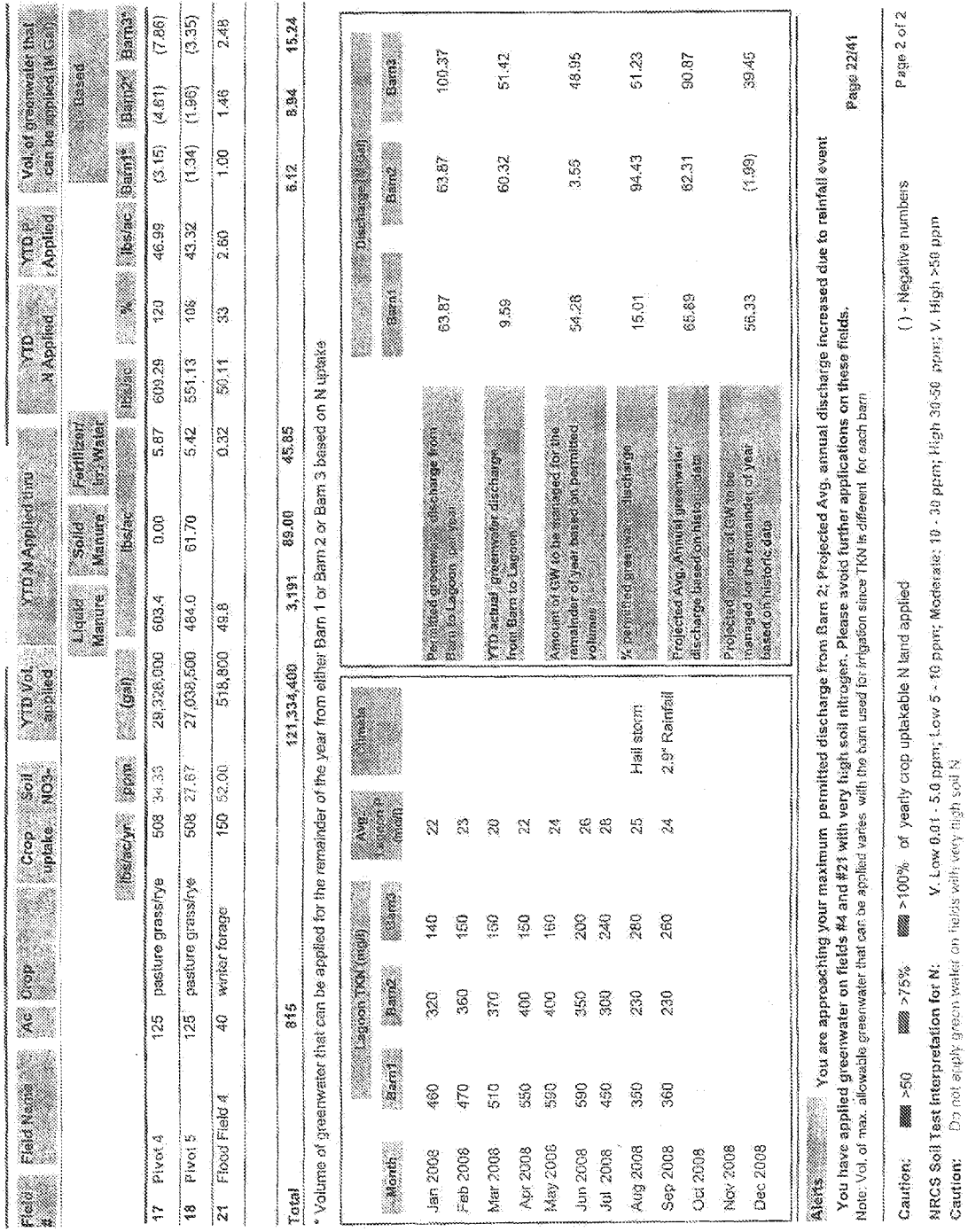

The second page of FIGS. 3-16, left hand box, middle, indicates the date and the measured lagoon content with respect to the targeted substance. It is preferred to update these measurements monthly.

The box on the right, middle of the second page of FIGS. 3-16, can be helpful to an operator. The fifth row predicts the annual historic need to discharge greenwater from a barn and its lagoon, based on historic data. Row six predicts the amount of greenwater, anticipated as needed to be "managed," for the remainder of the period. A comparison of the greenwater "needing to be managed" with the forecast of the total permissible discharge from each lagoon to all the fields for the remainder of the period, gives an indication of whether or not the year is on track.

The last three columns last row, indicate the total amount of greenwater that can permissibly be applied, from each barn individually, to the fields and remain in compliance. Taking into account losses due to evaporation and other causes, an operator can estimate whether the need to "manage" greenwater from the barns (sixth row of right hand box) significantly exceeds the capacity of the fields to permissibly absorb the greenwater from the lagoons, for the remainder of the period (last row, last three columns of forecast.) The January beginning of the year forecast alone shows the plan for the year to be ill fated. Ignoring for the moment losses due to evaporation and other causes, it would take the capacity of all nine fields absorb the greenwater that historically needs to be discharged from barn 1 and barn 2 alone. There is no apparent capacity to absorb the greenwater from barn 3 at all. And this is ignoring the warning that some fields should receive no greenwater, based on prior soil testing.

Had this point been forecast to the operator on the first day of 2007, arguably the discharge from barn 3 could have been dried and carted away, or some other action taken.

Box 1 on the right in the middle of the second page row 1-3, indicates that the discharge from barns 1, 2 and 3 will be within the "permitted" greenwater discharge from the barns to the lagoons for the year. Such illustrates that permits do not guarantee compliance.

(Note: a beginning of the year report would use a lagoon TKN number that remained from the end of the prior agronomic period.)

The fifth and sixth rows of the box in the middle right of FIG. 3B can be taken to reflect the "push" on the operator, to apply discharge from the barns. The last three columns of the forecast output indicate the capacity of the fields to accept discharge, or the "pull" on the operator to apply nutrients to the fields from the lagoons. When the projected "push" is destined to exceed the projected "pull" for the year, taking into account some factor for evaporation and other losses, it is well to appreciate this fact as early as possible in order to take corrective measures.

Notes: in September a 25 year 24-hour event was added which reflected storm water run-off and direct precipitation run-off to the lagoons. This figure was taken into account under the average projected amount of greenwater to be managed for the remainder of the year. A footnote was added in that month explaining the entry. The anticipated need to discharge lagoon water, thus, can and should be updated.

The freshwater application report, FIGS. 17 through 30, indicate the water rights vis-à-vis year to date freshwater applied. Review of the December report shows that freshwater rights were violated on two fields.

The foregoing description of preferred embodiments of the invention is presented for purposes of illustration and description, and is not intended to be exhaustive or to limit the invention to the precise form or embodiment disclosed. The description was selected to best explain the principles of the invention and their practical application to enable others skilled in the art to best utilize the invention in various embodiments. Various modifications as are best suited to the particular use are contemplated. It is intended that the scope of the invention is not to be limited by the specification, but to be defined by the claims set forth below. Since the foregoing disclosure and description of the invention are illustrative and explanatory thereof, various changes in the size, shape, and materials, as well as in the details of the illustrated device may be made without departing from the spirit of the invention. The invention is claimed using terminology that depends upon a historic presumption that recitation of a single element covers one or more, and recitation of two elements covers two or more, and the like. Also, the drawings and illustration herein have not necessarily been produced to scale.

What is claimed is:

1. A method to facilitate a best management practice application of manure from a plurality of liquid or solid manure sources to a plurality of crops in at least one field according to an agronomic standard based on at least one targeted substance, for an agronomic period, comprising:

providing data to a computer and software sufficient to estimate, directly or indirectly, content of at least one targeted substance, found in the manure, for each manure source and updating the data at least twice a year;

providing uptake data to a computer and software sufficient to estimate, directly or indirectly, crop uptake of the at least one targeted substance for the plurality of crops in the at least one field and updating the uptake data at least once a year;

providing periodic application data to the computer and software of amounts of manure applied from manure sources to the at least one field; and outputting from the computer, at least twice per month, indicia of a predicted limit of future application of manure from at least one manure source in regard to the at least one targeted substance for a remainder of the agronomic period according to the agronomic standard.

2. The method of claim 1 including directly or indirectly determining a targeted substance limit per field for the agronomic period for at least one field.

3. The method of claim 2 including adjusting a targeted substance limit for a field according to an input of at least one soil pre-condition factor, such as initial estimate of soil content of at least one targeted substance.

4. The method of claim 1 that includes updating content of at least one targeted substance at least once over a field crop season.

5. The method of claim 1 that includes updating crop uptake at least once per year.

6. The method of claim 1 that includes inputting, to the computer directly or indirectly, data relative to predicted necessary discharge of manure from at least one liquid manure source for the remainder of the agronomic period, and outputting indicia of predicted necessary discharge of manure from at least one liquid manure source for the remainder of the agronomic period.

7. The method of claim 1 including:
providing, to the same or a different computer and software, information sufficient to predict, for at least one field, for the agronomic period, at least one application limit amount and applied to date for the targeted substance; and
outputting at least twice monthly an indicia of a predicted forecast of at least one of (1) a percent of the targeted substance limit applied vis-à-vis the percent of agronomic period and (2) for each lagoon, the maximum liquid manure that could be applied to each field from any one source for the remainder of the agronomic period such that predicted targeted substance existing and to be applied does not exceed predicted targeted substance agronomic limit plus uptake for each field.

8. The method of claim 7 wherein the information sufficient to predict a targeted substance application limit amount per field per agronomic period includes anticipated or actual crops, or both, for the field and expected or actual crop uptake, or both, of targeted substance per field.

9. The method of claim 7 wherein information sufficient to predict the targeted substance applied per field per agronomic period includes a liquid and said manure application history and chemical fertilizer application history for the field and an estimate of a targeted substance content of manure sources.

10. The method of claim 7 that includes providing, to the same or different computer and software, information sufficient to project a need, for the agronomic period, to discharge from a liquid manure source for the remainder of an agronomic period and wherein the information sufficient to project a need for the remainder of the agronomic period to discharge from a liquid manure source includes a projected need to input liquid manure into the source for the period plus actual source output to date for the period plus parameters permitting an estimate of liquid manure source loss due to at least evaporation.

11. The method of claim 1 including:
for the same or different agronomic period and for the same or a different targeted substance,
inputting:
directly or indirectly, parameters adequate to predict
(a) at least one targeted substance uptake for the at least one fields, updated at least once per period; and
(b) content of the at least one targeted substance in each ola plurality of manure sources, including at least one liquid manure source, updated at least two times per period; and
an application history of manure from the sources to the fields; and
outputting, as a function of the input, at least twice monthly, indicia of as status of each field with respect to targeted substance application vis-à-vis targeted substance limit of the at least one targeted substance or at indicia of a forecast agronomic limit for future manure application to the fields from the at least one liquid manure source.

12. The method of claim 11 that includes inputting an indicia of a predicted need to apply liquid manure from at least one lagoon source to the fields for the agronomic period.

13. The method of claim 12 that includes updating the predicted need to apply at least once per agronomic period.

14. The method of claim 1 or 11 including outputting indicia for a plurality of targeted substances.

15. The method of claim 1 or 11 wherein the agronomic period is a year that may include growing one or more crops.

16. The method of claim 1 or 11 that includes outputting at least one crop optimization parameter, including at least one of a nutrient requirement or a water requirement.

17. The method of claim 1 or 11 that includes inputting a freshwater rights limitation and a freshwater application history for each field and outputting an indicia of a forecast freshwater limitation for application to a field over a future period.

18. The method of claim 1 or 11 wherein the field or fields are animal feeding operation (AFO) or concentrated animal feeding operation (CAFO) fields.

19. The method of claim 1 or 11 that includes inputting a parameter relating to the addition of the at least one targeted substance to a field by means of nutrient sources including at least one of manure solids, compost and commercial chemical fertilizers, and nutrients in irrigation water.

20. The method of claim 1 or 11 wherein the targeted substance uptake is a function of predicted crop yield and a predicted crop uptake of the targeted substance.

21. The method of claim 1 or 11 wherein the sources include a plurality of lagoons.

22. The method of claim 1, 7 or 11 that includes outputting at least every 15 days.

23. The method of claim 1, 7 or 11 that includes outputting after each day having a liquid or solid manure application to a field.

24. The method of claim 1, 7 or 11 wherein the agronomic period is a calendar year.

25. The method of claim 1, 7 or 11 wherein the agronomic period is one or more crop seasons.

* * * * *